United States Patent [19]

Kawakami

[11] Patent Number: 5,452,144
[45] Date of Patent: Sep. 19, 1995

[54] VIDEO TAPE RECORDER CARRYING OUT FIELD EXTRACTION RECORDING AND/OR REPRODUCTION OF A VIDEO SIGNAL

[75] Inventor: Kouichi Kawakami, Osaka, Japan

[73] Assignee: Sanyo Electric Co., Ltd., Moriguchi, Japan

[21] Appl. No.: 120,930

[22] Filed: Sep. 15, 1993

[30] Foreign Application Priority Data

Sep. 17, 1992 [JP] Japan .................. 4-247915
Dec. 17, 1992 [JP] Japan .................. 4-337358
Mar. 18, 1993 [JP] Japan .................. 5-058959

[51] Int. Cl.$^6$ .............................. H04N 5/78
[52] U.S. Cl. .............................. 360/11.1; 360/73.14
[58] Field of Search ............ 360/35.1, 11.1, 9.1, 360/10.1, 10.3, 73.14, 8

[56] References Cited

U.S. PATENT DOCUMENTS

| | | | |
|---|---|---|---|
| 4,035,843 | 7/1977 | Tanimura | 360/35.1 |
| 4,496,995 | 1/1985 | Colles et al. | 360/11.1 X |
| 4,796,104 | 1/1989 | Ito et al. | 360/35.1 X |
| 5,144,210 | 9/1992 | Sato | 360/9.1 X |
| 5,170,295 | 12/1992 | Miyahara | 360/9.1 X |
| 5,239,418 | 8/1993 | Tyler et al. | 360/10.3 |

OTHER PUBLICATIONS

Sanyo Technical Review vol., 13 No. 2 Aug. 1981; "Normal, Stop-Action and Slow-Motion VTR Performance in a 4-Head System".

Primary Examiner—Andrew L. Sniezek
Attorney, Agent, or Firm—Armstrong, Westerman, Hattori, McLeland & Naughton

[57] ABSTRACT

A time lapse VTR carrying out field extraction recording includes a gate for extracting intermittently a supplied video signal at a ratio of one field to every three fields, a switching circuit for designating selectively a tape running speed of either 1/9 or 1/12 the tape running speed of a SP mode in the VHS system, and a servo control circuit for driving a capstan motor to run a magnetic tape at the designated tape running speed. The video signal extracted intermittently by the gate circuit is recorded at an azimuth angle differing from each field by a plurality of video heads on a magnetic head running at the designated tape running speed. As a result, the reproduction compatibility of a magnetic tape having field extraction recorded by a time lapse VTR with an EP mode of a conventional VTR of the VHS system is ensured.

18 Claims, 24 Drawing Sheets

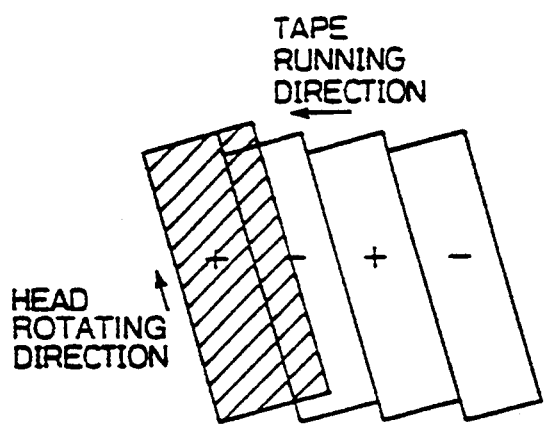
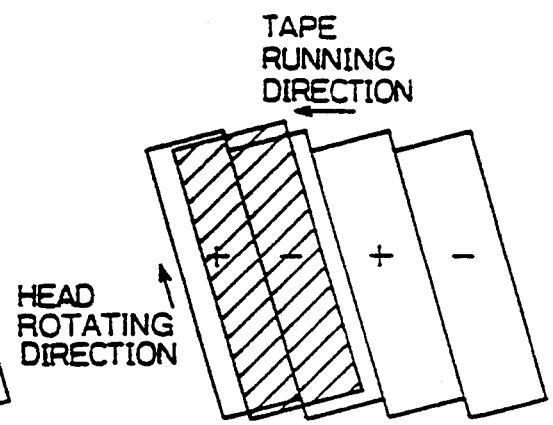
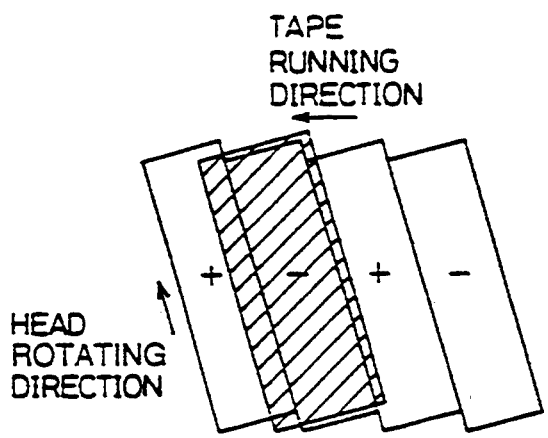
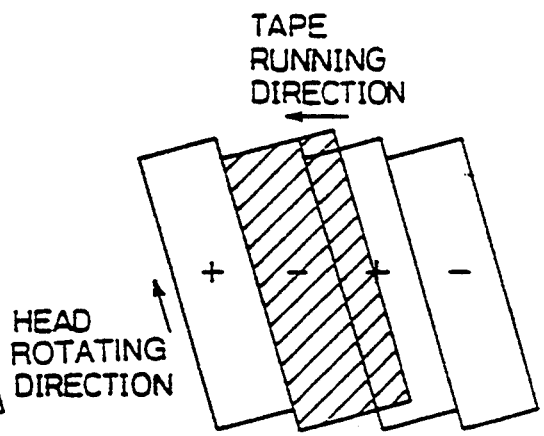
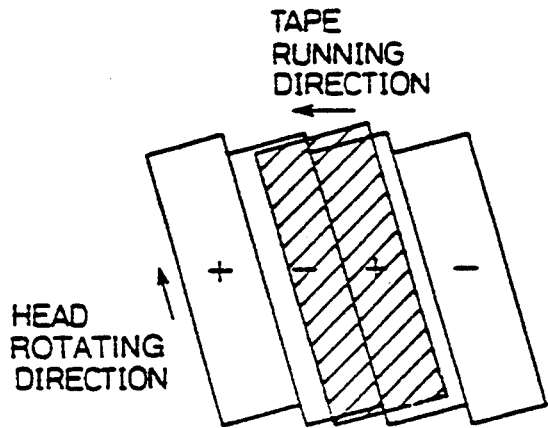
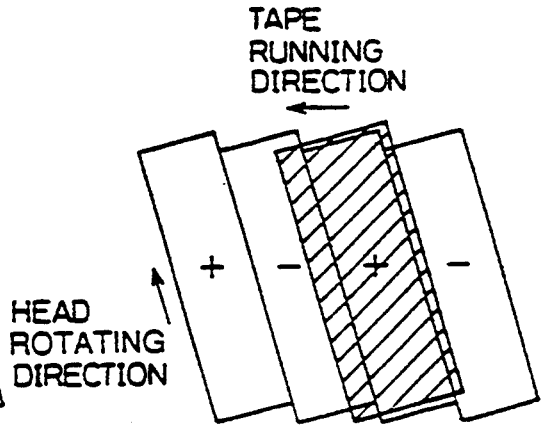

VIDEO TAPE RECORDER CARRYING OUT FIELD EXTRACTION RECORDING AND/OR REPRODUCTION OF A VIDEO SIGNAL

BACKGROUND OF THE INVENTION

1. Field of the Invention

The present invention relates to video tape recorders (VTR), and more particularly to the so-called time lapse VTR that allows long-time recording by carrying out field extraction recording of a video signal at a predetermined period.

2. Description of the Background Art

The so-called time lapse VTR is developed wherein a video signal is sequentially recorded on a tape at a ratio of one field to every N fields (field extraction recording) while running the tape at a speed of 1/N (N is an integer) the standard tape running speed at the time of recording, and wherein a video signal on a tape is reproduced while running the tape at the aforementioned standard tape running speed to obtain a high speed reproduced picture at the time of reproduction. Such a time lapse VTR allows long-time recording by the above-described field extraction recording in comparison to the case where a standard video signal recording is carrying out at a standard tape running speed. It is used in various fields requiring long-time recording such as for a security monitor camera.

An example of such a time lapse VTR is disclosed in Japanese Patent Laying-Open No. 62-166671. In this conventional example, a video signal is extracted at a ratio of one field to every three fields (a three-field period) such as the first field, the fourth field, the seventh field, . . . , to be recorded on a magnetic tape. Therefore, a recording pattern is formed of an alternate arrangement of odd number fields and even number fields on a magnetic tape. That is to say, adjacent tracks on a magnetic tape can be formed using separate heads having azimuth angles differing from each other.

Although such a conventional time lapse VTR allows recording of a long term (3 times) by a field extraction recording of a 3-field period, there is no particular definition of the tape running speed with respect to the standards of a VHS system, and is defined as only to be constant. Therefore, direct compatibility was absent, and had a problem that a video signal recorded on a magnetic tape with the above-described time lapse VTR could not be reproduced with a conventional VTR of the VHS system.

A conventional time lapse VTR is generally provided with a 4-head cylinder of double-azimuth mainly for reproduction. A 4-head cylinder of double-azimuth includes a pair of heads A+ and A− having azimuth angles differing from each other and arranged opposed to each other by 180° along the circumference of the cylinder, and another pair of heads B+ and B− having azimuth angles differing from each other (head B+ having an azimuth angle identical to that of head A+, and head B− having an azimuth angle identical to that of head A−) and arranged opposed to each other by 180° along the circumference of the cylinder. Head B− is arranged in the proximity of head A+, and head B+ is arranged in the proximity of head A−.

In the above-described time lapse VTR, still-reproduction or slow-reproduction may be carried out by an intermittent reproduction in which the same track is traced for a plurality of times at the time of reproduction. In this case, the same track, i.e. one track formed by a recording head of one azimuth angle, must be traced by a head having the same azimuth angle continuously for a plurality of times. Therefore, heads of the same azimuth angle must be provided at positions opposing to each other by 180° along the circumference of the cylinder (in the above-described embodiment, the pair of heads A+ and B+, and the pair of heads A− and B−). Therefore, a 4-head cylinder of double-azimuth is provided at least for reproduction.

At the time of reproduction, the envelopes of reproduced outputs from respective heads are compared, and a head from which a greater reproduction output is obtained is selected as a reproduction head. More specifically, the outputs of a pair of heads arranged adjacent to each other with different azimuth angles and tracing a track (the pair of heads A+ and B−, or the pair of heads A− and B+) are constantly compared. When the relation in magnitudes of the outputs is reversed, the reproduction head is switched at any time, even during a tracing of a track of one field.

This results in a reproduced video signal having a discrete step in level at the time of switching the reproduction head, leading to a problem that noise is generated on the reproduction screen.

SUMMARY OF THE INVENTION

In view of the foregoing, an object of the present invention is to provide a time lapse VTR that has compatibility with a conventional VTR of the VHS system.

Another object of the present invention is to provide a time lapse VTR without generation of noise cause by head switching during reproduction of a recording track.

According to an aspect of the present invention, a video tape recording for carrying out field extraction recording includes a signal source, a gate circuit, a tape running speed designating circuit, a capstan motor drive control circuit, and a plurality of video heads. The signal source supplies a video signal to be recorded. The gate circuit extracts the supplied video signal intermittently at a ratio of one field to every three fields. The tape running speed designating circuit designates a tape running speed of 1/9 the tape running speed of a SP mode of the VHS system. The capstan motor drive control circuit drives and controls a capstan motor to run a magnetic tape at the designated tape running speed. The plurality of video heads record the video signal extracted intermittently by the gate circuit on a magnetic tape running at the designated tape running speed at an azimuth angle differing for each field.

According to another aspect of present invention, a video tape recorder for carrying out field extraction recording includes a signal source, a gate circuit, a tape running speed designating circuit, a capstan motor drive control circuit, and a plurality of video heads. The signal source supplies a video signal to be recorded. The gate circuit extracts intermittently the supplied video signal at a ratio of one field to every three fields. The tape running speed designating circuits designates a tape running speed of 1/12 the tape running speed of a SP mode of the VHS system. The capstan motor drive control circuit drives and controls a capstan motor to run a magnetic tape at the designated tape running speed. The plurality of video heads record the video signal extracted intermittently by the gate circuit on a magnetic tape running at the designated tape running speed at an azimuth angle differing from each field.

According to a further aspect of the present invention, a video tape recorder for carrying out field extraction recording includes a signal source, a gate circuit, a tape running speed designating circuit, a capstan motor drive control circuit, and a plurality of video heads. The signal source supplies a video signal to be recorded. The gate circuit extracts intermittently the supplied video signal at a ratio of one field to every three fields. The tape running speed designating circuit selectively designates a tape running speed of either 1/9 or 1/12 the tape running speed of a SP mode of the VHS system. The capstan motor drive control circuit drives and controls a capstan motor to run a magnetic tape at the designated tape running speed. The plurality of video heads record the video signal extracted intermittently by the gate circuit on a magnetic tape running at the designated tape running speed at an azimuth angle differing from each field.

According to still another aspect of the present invention, a vide tape recorder allowing special reproduction by field forwarding at a LP mode of the VHS system includes a reproduction circuit for video and control signals, a pseudo control signal formation circuit, a capstan motor drive control circuit, and a pseudo control signal generation period setting circuit. The reproduction circuit for video and control signals reproduces a video signal and a control signal recorded on a magnetic tape. The pseudo control signal formation circuit forms a pseudo control signal at a timing at which the control signal is to be reproduced when the reproduced control signal is missing. The capstan motor drive control circuit drives and controls a capstan motor in response to a reproduced control signal or the pseudo control signal at the time of special reproduction by field forwarding. The pseudo control signal generation period setting circuit sets the generation period of the pseudo control signal so that the field forwarding amount of the capstan motor becomes ½ the general field forwarding amount in special reproduction by field forwarding in a LP mode, when the video signal and the control signal are reproduced by special reproduction by field forwarding from a magnetic tape on which the video signal has been intermittently recorded at a ratio of one field to every three fields, and the control signal has been recorded once for six fields at a tape running speed of 1/12 the tape running speed of a SP mode in the VHS system.

According to a still further aspect of the present invention, a video tape recorder includes a signal source, a recording track pattern formation circuit, a control signal recording circuit, a 4-head cylinder of double-azimuth, a first switching circuit, a second switching circuit, a control signal detection circuit, and a control circuit.

The signal source supplies a video signal to be recorded. The recording track pattern formation circuit extracts the supplied video signal at a ratio of one field to every predetermined number of fields. The extracted video signal is recorded alternately by each field on a magnetic tape at first and second azimuth angles differing from each other to form a continuous recording track pattern. The control signal recording circuit records a control signal on a control track on the magnetic tape in synchronization with recording by a determined one of the first and second azimuth angles. The 4-head cylinder of double-azimuth is used at least for reproducing the video signal recorded on the magnetic tape, and includes a first pair of heads of a first head having the first azimuth angle and a second head having the second azimuth angle and disposed in the proximity of the first head, and a second pair of heads of a third head having the second azimuth angle and disposed opposed to the first head along the circumference of the cylinder and a fourth head having the first azimuth angle and disposed in the proximity of the third head and opposing to the second head along the circumference of the cylinder. The first switching circuit selects alternately outputs of the first pair of heads and outputs of the second pair of heads for every half rotation of the cylinder at the time of reproduction of the magnetic tape. The second switching circuit selectively switches between a first state in which the reproduced output of the first head is selected out of the outputs of the first pair of heads selected by the first switching circuit or the reproduced output of the third head is selected out of the second pair of heads selected by the first switching circuit, and a second state in which the reproduced output of the second head is selected out of the first pair of heads selected by the first switching circuit or the reproduced output of the fourth head is selected out of the second pair of heads selected by the first switching circuit. The control signal detection circuit detects the control signal recorded on a control track on a magnetic tape at the time of reproduction of the magnetic tape. The control circuit controls the second switching circuit responsive to the detected control signal to switch to the first state over a preset first time period and to the second state over a second time period differing from the first time period, with the recording track having a predetermined position relationship with a control signal detected on the magnetic tape as the origin.

According to yet a further aspect of the present invention, a video tape recorder further includes a circuit for detecting the rotation phase of the cylinder to generate switching pulses to control the switching operation of the first switching circuit. When there is a predetermined phase difference between a predetermined edge of the detected control signal and a predetermined edge of the switching pulses, the control circuit controls the second switching circuit to switch between the first state and the second state with the detection of an edge of a predetermined order of a switching pulses as the origin from a predetermined edge of the detected control signal.

According to yet another aspect of the present invention, a video tape recorder includes a tracking adjustment circuit for adjusting the running phase of the magnetic tape at the time of reproduction. The control circuit controls the second switching circuit to switch between the first state and the second state with the detection of an edge of a predetermined order of the edges of the switching pulses as the origin from the edge that will not have the phase relationship with respect to the detected control signal inverted by phase adjustment of the tracking adjustment circuit.

According to yet a still further aspect of the present invention, a video tape recorder further includes a circuit for delaying the output of the second switching circuit by a time corresponding to the time difference between the first and second heads tracing the same position on a magnetic tape when the first head abuts against the tape prior to the second head at the time of reproduction of the magnetic tape, and a third switching circuit for selecting an output of the delay circuit in the first state and the second switching circuit in the second state to provide the selected output as a reproduced video signal.

The main advantage of the present invention is to carry out field extraction recording once for every three fields at a tape running speed of 1/9 the reference speed standardized for a SP mode in the VHS system, so that such a magnetic tape recorded with field extraction can be reproduced in an EP mode of a conventional VTR of the VHS system, and allows a long-time recording while maintaining reproduction compatibility with a VTR of the VHS system.

Another advantage of the present invention is to carry out field extraction recording of one field for every three fields at a tape running speed of 1/12 the reference speed standardized for a SP mode in the VHS system, so that reproduction compatibility of such a field extraction recorded magnetic tape with a VTR of the VHS system is achieved by just slightly modifying the circuit for special reproduction of a LP mode of the VHS system.

A further advantage of the present invention is to obtain a clear reproduced picture without noise since switching of the reproduction heads is not required during reproduction of a recording track based upon determination of the magnitudes of the envelopes of reproduced outputs from reproduction heads.

Still another advantage of the present invention is to achieve optimum selection of a proper reproduction head independent of change in the phase relationship between a reproduced control signal and a switching pulse due to tracking adjustment.

A still further advantage of the present invention is to suppress variation in the period of a vertical synchronizing signal caused by the distance between adjacent heads of a 4-head cylinder of double-azimuth, so that irregularity in the reproduced picture can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A to 9F are diagrams schematically showing the relationship between a recording track and a reproduction head in each time section of the coordinate graph of FIG. 8.

DESCRIPTION OF THE PREFERRED EMBODIMENTS

Figure 1:
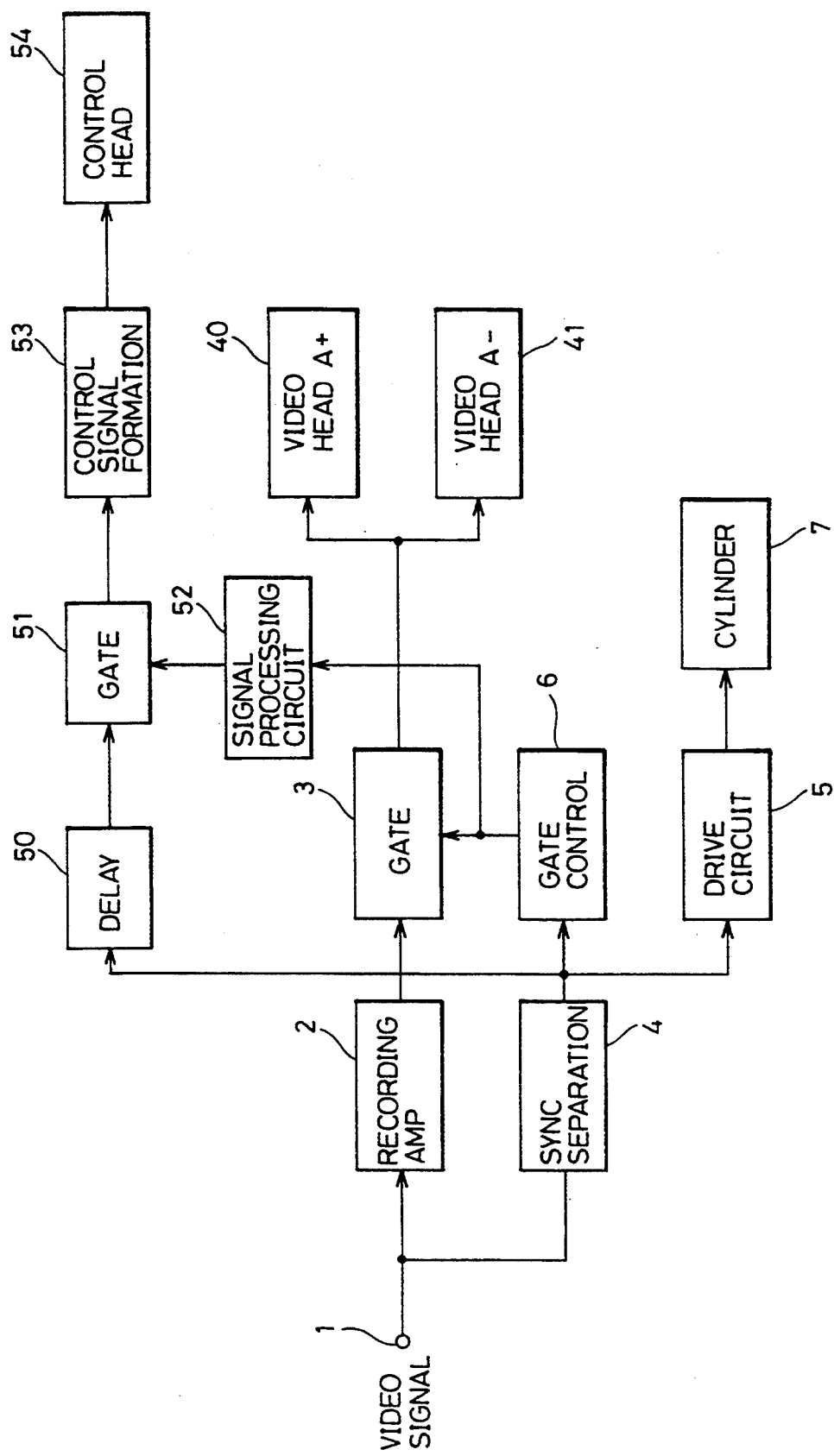
FIG. 1 is a block diagram schematically showing the recording system of a VTR according to a first embodiment of the present invention.

FIG. 1 is a block diagram for describing the recording system for a video signal of a VTR according to the first embodiment of the present invention, and particularly for describing the provision of a video signal and a control signal to a head.

Figure 2:
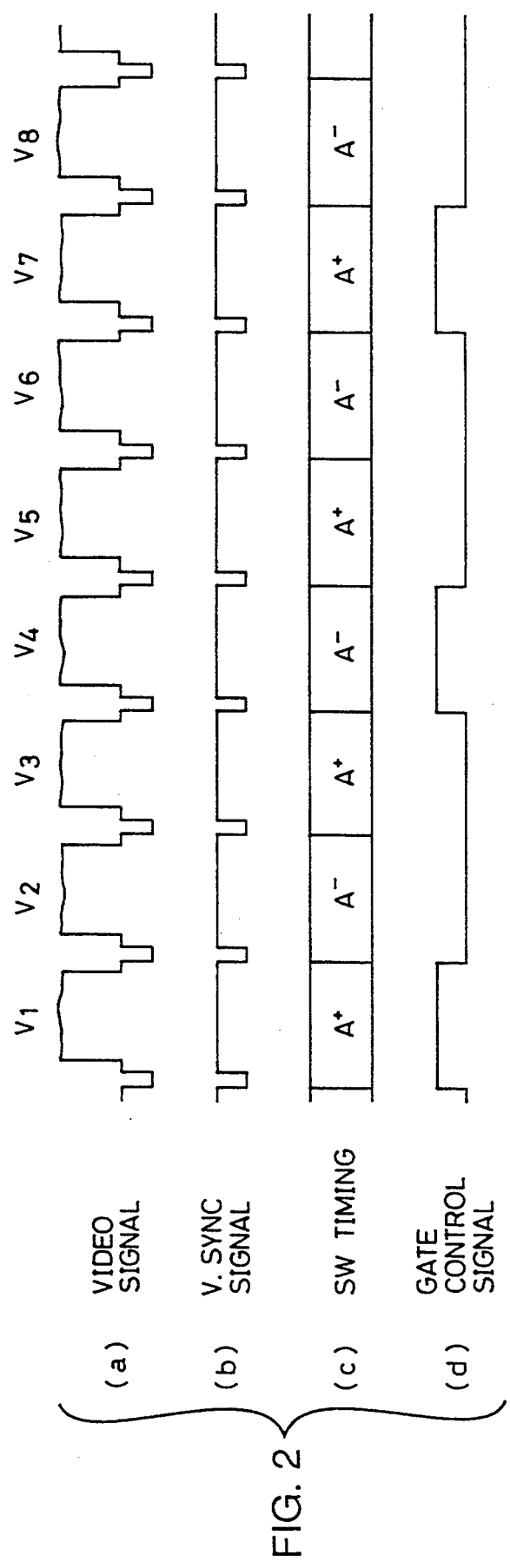
FIG. 2 is a timing chart for describing the operation of the recording system of the VTR of FIG. 1.

Referring to FIG. 1, a video signal supplied from, for example, a video camera not shown via an input terminal 1 is applied to a synchronization (sync) separation circuit 4 and also to a recording amplifier 2. The signal applied to recording amplifier 2 is amplified to be provided to a gate circuit 3. Sync separation circuit 4 extracts a vertical synchronizing signal shown in FIG. 2(b) from the input video signal. The extracted vertical synchronizing signal is applied to a cylinder drive circuit 5, a gate control circuit 6, and a delay circuit 50. With the input vertical synchronizing signal as a reference signal, cylinder drive circuit 5 rotates at a constant speed a rotary cylinder not shown to which an A+ video head 40 and an A− head 41 that will be described afterwards are attached.

Gate control circuit 6 responds to the input vertical synchronizing signal to form a gate control signal shown in FIG. 2(d). The gate control signal is applied to gate circuit 3 and a signal processing circuit 52. Gate control signal is a square wave signal that takes a H level at a ratio of one field to every three fields as shown in FIG. 2(d). Gate circuit 3 responds to this gate control signal to allow passage of the video signal provided from recording amplifier 2 only during such a H level period. More specifically, by operation of gate circuit 3, a video signal of one field is intermittently sampled, i.e. a field is extracted at a cycle of three fields, such as the video signal V1 of the first field, the video signal V4 of the fourth field, the video signal V7 of the seventh field, ... of the video signal shown in FIG. 2(a).

The video signal output from gate circuit 3 is supplied to A+ video head 40 and A− head 41 attached to a rotary cylinder not shown. This pair of video heads 40 and 41 have azimuth angles opposite to each other and are arranged opposing to each other by 180° along the circumference of the cylinder. Therefore, these heads 40 and 41 trace a magnetic tape alternately at the timing shown in FIG. 2(c). The tape running speed which will be described afterwards is ⅓ the so-called EP mode of the VHS system.

Figure 3:
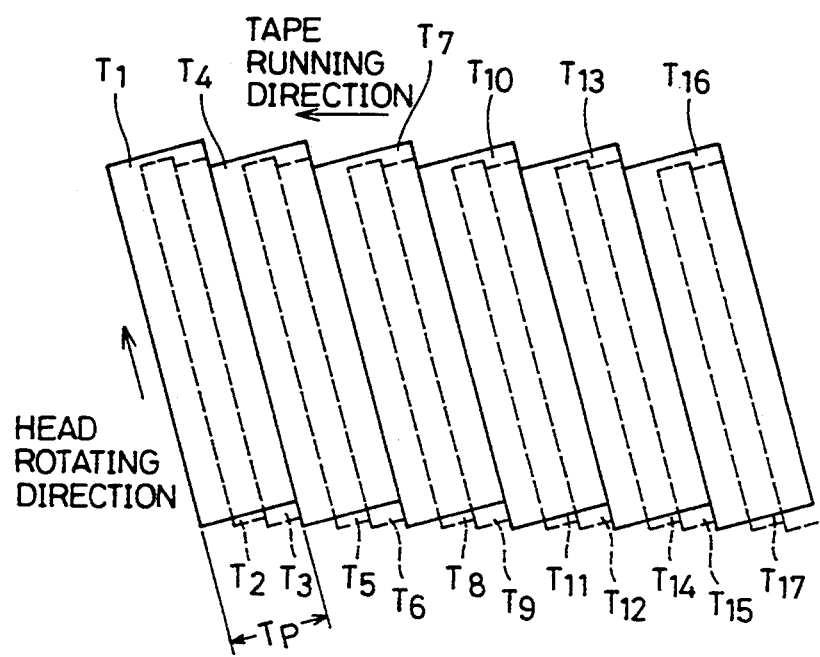
FIG. 3 schematically shows the track pattern formed on a magnetic tape by the VTR according to the first embodiment of the present invention of FIG. 1.

Heads 40 and 41 should originally form a track pattern of T1, T2, T3, T4, ..., T15, T16, T17, ... with partial overlapping by tracing alternately the magnetic tape as shown in FIG. 3. Actually, however, a video signal is supplied to the head only at a ratio of once for every three fields due to the above-described ⅓ field extraction recording. Therefore, as shown by the solid line of FIG. 3, video signal V1 of the first field is first recorded on the tape by A+ video head 40 to form a track pattern T1. Because a video signal is not supplied from gate circuit 3 during the time period of the next two fields, no signal is overwritten on the regions of track patterns T2 and T3 indicated by the broken line.

Then, video signal V4 of the fourth field is recorded on the tape by A− video head 41 to form a track pattern T4 (solid line). Because the next time period of the subsequent two fields do not have a video signal provided from gate circuit 3, a signal will not be overwritten on the regions of track patterns T5 and T6 shown by the broken line. Next, video signal V7 of the seventh field is recorded on the tape by A+ video head 40 to form a track pattern T7 (solid line). Similarly, track patterns T10, T13, T16, ... indicated by solid lines are formed by field extraction recording by heads 41, 40, 41, .... Therefore, respective adjacent tracks are formed by heads of different azimuth angles. The circuitry regarding the recording system of a control signal shown in FIG. 1 will be described afterwards.

Figure 4:
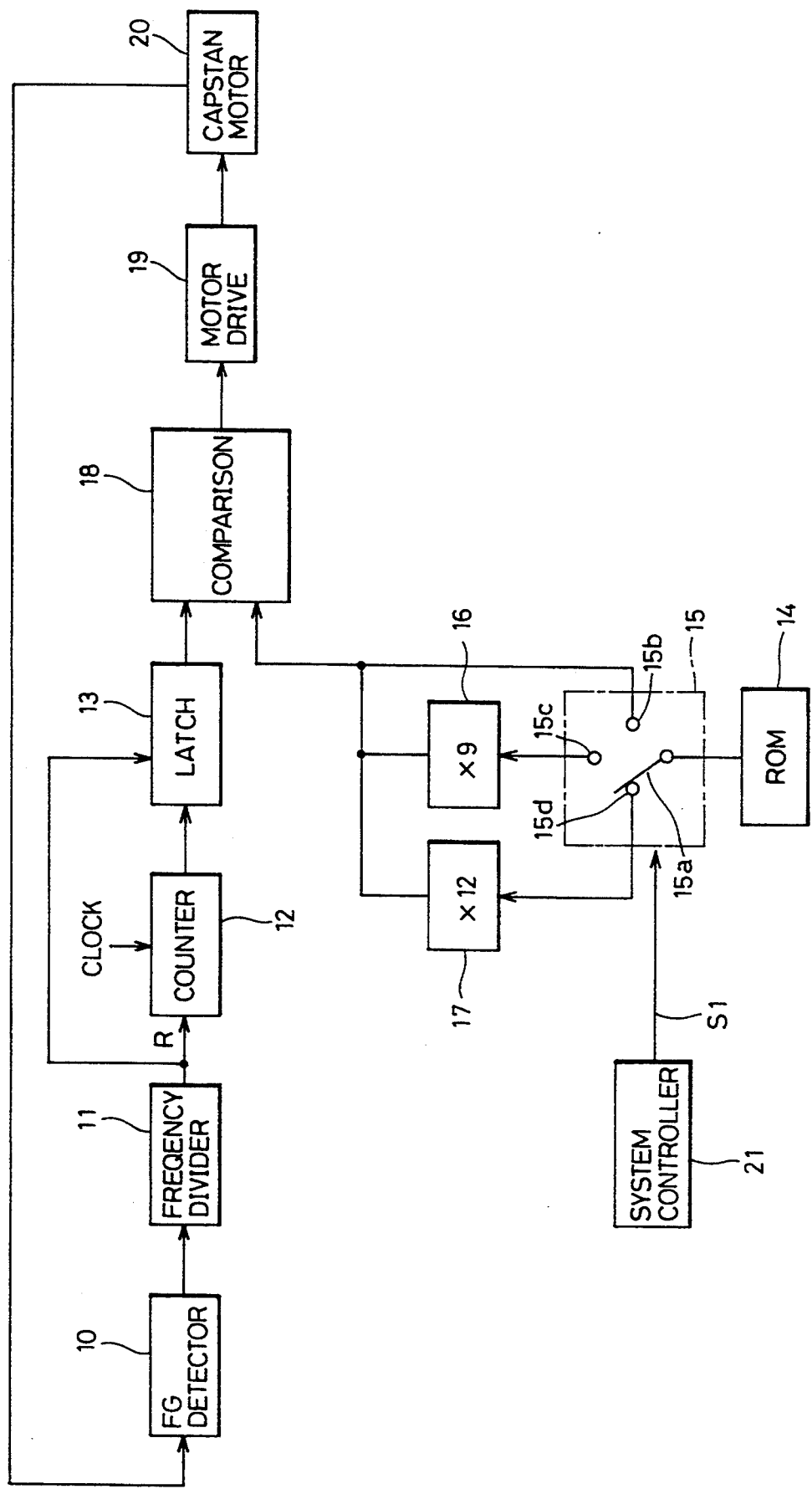
FIG. 4 is a block diagram schematically showing the control system of a capstan motor of the VTR according to the first embodiment of the present invention.

FIG. 4 is a block diagram schematically showing the control system of a capstan motor driving a capstan (not shown) that carries out tape travel in the VTR according to the first embodiment of the present invention. Referring to FIG. 4, the rotation speed of a capstan motor 20 is detected by a FG detector 10. FG detector 10 provides a FG signal of a frequency proportional to the rotation speed of capstan motor 20. This FG signal is frequency-divided by a predetermined frequency division ratio by frequency divider circuit 1t to be applied to the reset input of counter 12.

Counter 12 counts clock pulses supplied from a clock signal source not shown, and is reset at the rising edge of a frequency-divided FG signal. Therefore, a value corresponding to the period of the frequency-divided FG signal is provided as a count value from counter 12, which is latched by a latch circuit 13 in response to a rising edge of the FG signal. The above-described counter 12 and latch circuit 13 form a speed detector. The output of latch circuit 13 is applied to one input of a comparison circuit 18.

A conventional VTR of the VHS system has 3 types of reference speed modes defined by standard. The three types of speed mode includes: (i) an SP mode (the so-called standard mode) in which the tape running speed is 33.4 mm/seconds ($V_{sp}$); (ii) an LP mode in which the tape running speed is ½ the tape running speed of the SP mode ($V_{ep}=V_{sp}\times\frac{1}{2}$); and (iii) an EP mode (the so-called triple mode) in which the tape running speed is ⅓ of the SP mode ($V_{ep}=V_{sp}\times\frac{1}{3}$). It is assumed that speed data for realizing the tape running speed of a SP mode out of the three above-described modes, i.e. data indicating the period of a FG signal in such case, is stored in a ROM 14 in FIG. 4.

The data stored in ROM 14 is applied to a movable armature 15a of a selecting circuit 15. A fixed contact 15b of selecting circuit 15 is connected to the other input of comparison circuit 18. A fixed contact 15c is applied to the other input of comparison circuit 18 via an arithmetic unit 16 that multiplies 9 times the input data. A fixed contact 15d is applied to the other input of comparison circuit 18 via an arithmetic unit 17 that multiplies by 12 the input data. The switching control of movable armature 15a of selecting circuit 15 is carried out in response to a tape speed switching signal S1 provided from a system controller 21 according to an arbitrary speed selected by the user.

Comparison circuit 18 compares the current speed data applied to its one input from latch circuit 13 with the reference speed data applied to the other input from selecting circuit 15 to generate the difference therebetween as a speed error signal, which is applied to motor driver 19. Motor driver 19 servo-controls the rotation speed of capstan motor 20 so that this speed error signal becomes 0, i.e. the current speed data matches the reference speed data.

Although a circuit for speed servo control is shown as a servo control circuit of a capstan motor in FIG. 4, it is possible to also carry out phase servo control at the same time. In this case, a phase error signal according to a phase difference between a phase signal in which a FG signal from FG detector 10 is frequency-divided by a predetermined frequency dividing ratio and a predetermined reference phase signal is added to the speed error signal to drive and control the capstan motor.

The compatibility of a magnetic tape having field extraction recorded in which the tape running speed is set to 1/9 of the speed $V_{sp}$ of the SP mode (standard mode), i.e. ⅓ of the EP mode (triple mode), with a conventional VTR of the VHS system will be described hereinafter.

Figure 5A:
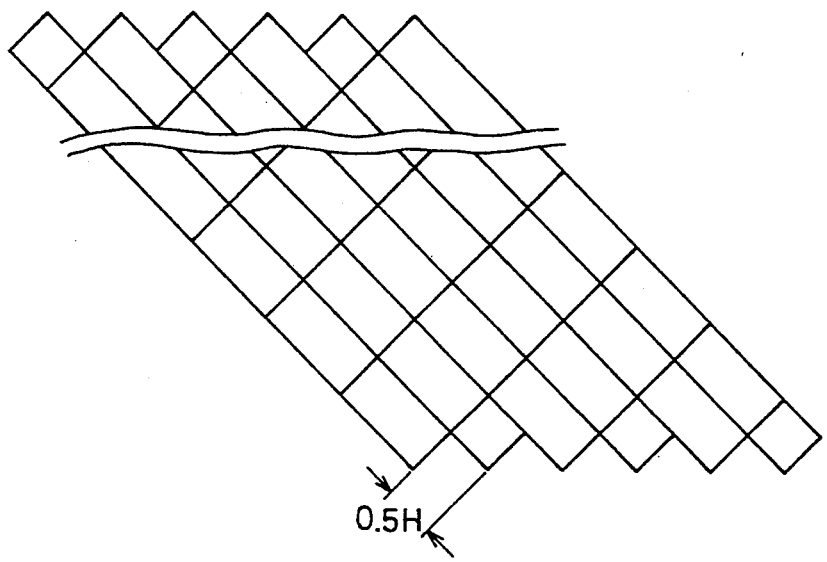
FIGS. 5A and 5B are diagrams for describing schematically the principle of the so-called H alignment.
Figure 5B:
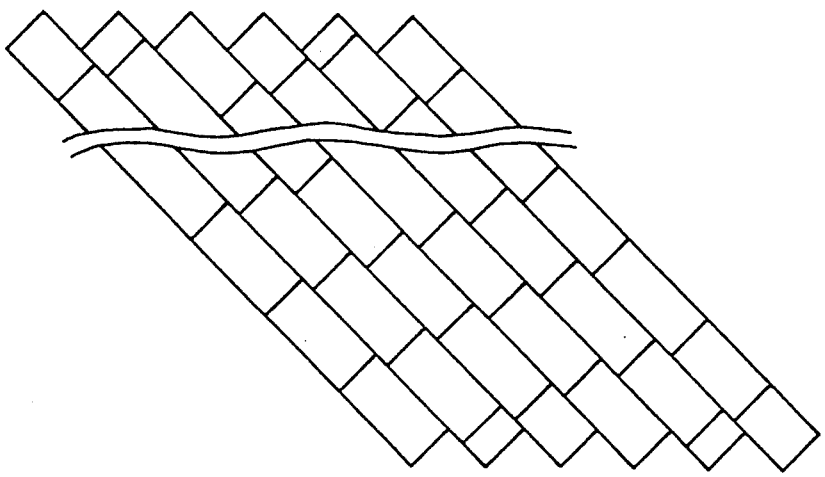
Figure 6:
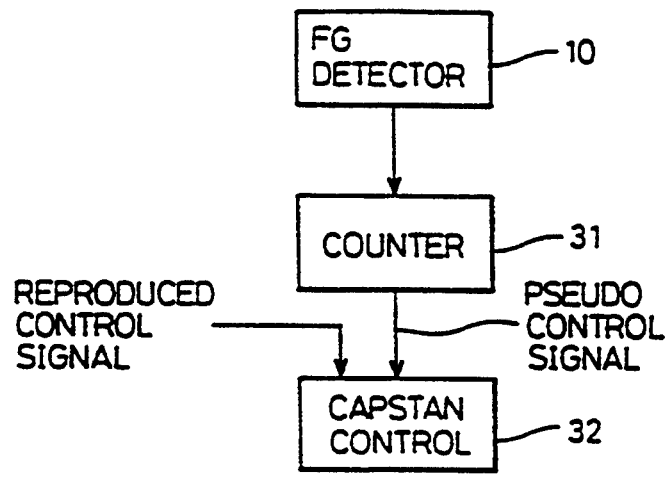
FIG. 6 is a block diagram schematically showing a capstan control system of a conventional VTR of the VHS system.
Figure 7:
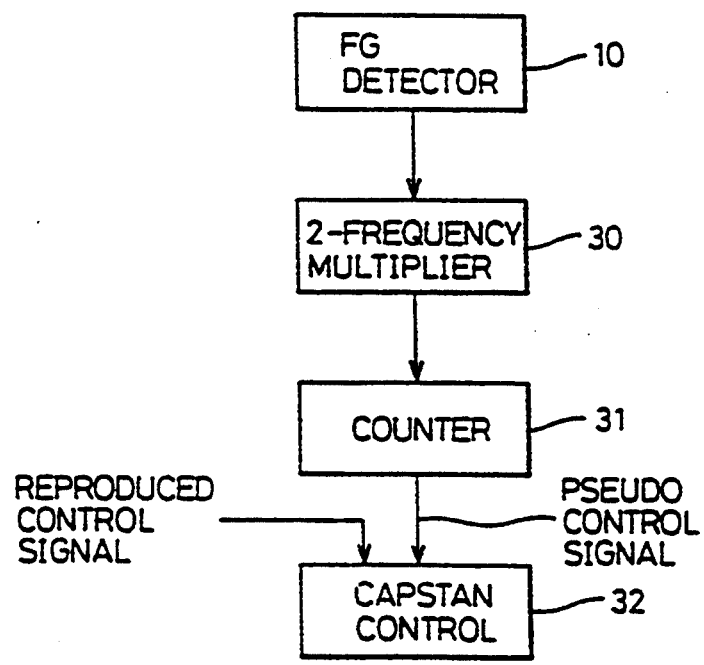
FIG. 7 is a block diagram schematically showing a capstan control system of a VTR of the VHS system modified according to the first embodiment of the present invention.

One factor which becomes a problem is the so-called "H alignment" of the track pattern. This H alignment serves to reduce influence of crosstalk by setting the position relationship of the video signals recorded on adjacent tracks on a magnetic tape so that horizontal synchronizing signals are aligned on straight lines. FIG. 5A shows a track pattern of such H alignment, and FIG. 5B shows a pattern without H alignment.

Suppose the number of scanning lines per field is nh, the tape speed $V_t$, the video track angle at tape stop $\theta$, the field frequency fv, the cylinder diameter $\phi$, and the horizontal period H, the deviation $\alpha H$ shown in FIG. 5A between tracks of horizontal synchronizing signals at the time of initiation is generally represented by the following equation (1).

$$\alpha H = \frac{2nh \cdot V_t \cdot \cos\theta}{fv \cdot \pi \cdot \phi + 2V_t \cdot \cos\theta} \quad (1)$$

Because θ is an extremely small angle, $\cos\approx 1$ is obtained. Furthermore, because $\pi\phi>>V_t/fv$, the above equation (1) becomes:

$$\alpha H = 2nh\cdot V_t/(fv\cdot\pi\cdot\phi)$$

so that αH is proportional to $V_t$.

Therefore, when recording of all the fields is carried out without field extraction at the tape speed of $V_{sp}\times 1/9$ which is 1/9 of the SP mode, this tape running speed corresponds to ⅓ of the EP mode. Considering that αH in the EP mode (triple mode) is 0.5H, αH=0.5-×(⅓) is obtained. If field extraction recording of a 3-field period is carried out as described above, αH becomes 3 times that of continuous recording as apparent from the track pattern of FIG. 3. Therefore, αH=(0.5H×(⅓))×3, resulting in αH=0.5H. This is consistent with αH in an EP mode of a normal VTR by the VHS system, i.e. the deviation between tracks of horizontal synchronizing signals at the beginning. This proves that, regarding H alignment, the tape having ⅓ field extraction recorded at a speed of $V_{sp}\times 1/9$ is compatible with the EP mode of a VTR of the VHS system.

There is another factor which becomes a problem in compatibility with a VTR of the VHS system. This factor is the so-called "track pitch". When the distance between the centers of two adjacent tracks on a tape, i.e. the track pitch is $T_p$, this $T_p$ is represented by the following equation (2).

$$T_p \approx \frac{2V_t}{fv\cdot\pi\cdot\phi}\times\frac{\pi\cdot\phi\cdot\sin\theta}{2}=\frac{V_t\cdot\sin\theta}{fv} \quad (2)$$

It is apparent from the above equation that the track pitch $T_p$ is proportional to the tape speed $V_t$. When all the fields are recorded without field extraction under the tape speed of $V_{sp}\times(1/9)$ which is 1/9 the SP mode, the track pitch $T_p$ equals $T_s/9$ where the track pitch of the SP mode is $T_s$ (58 μm). If field extraction recording of a 3-field period is carried out, it is apparent from the track pattern of FIG. 3 that the track pitch is three times the case of continuous recording, resulting in $T_p=T_s/3$. This matches the track pitch in the normal EP mode of the VHS system. Thus, the compatibility of a tape having ⅓ field extraction recorded at the speed of $V_{sp}\times(1/9)$ with the EP mode of a VTR of the VHS system is proved.

Another factor which becomes a problem of compatibility with a VTR of the VHS system is the recording pitch $T_c$ of a control signal. A control signal is generally recorded on a control track on a tape in synchronization with the recording timing of a video signal by a video head of a determined one azimuth angle of the two video heads. If recording of all the fields is carried out continuously, a control signal will be recorded at a period of 2 fields, and the recording pitch can be represented by "tape speed×2 field period". More specifically, in the case of the EP mode:

$$T_c=V_{ep}\times(1/30)=V_{sp}\times(⅓)\times(1/30)=V_{sp}/90 \text{ mm}$$

When field extraction recording is carried out with the circuitry of FIG. 1, the recording by a head of the same azimuth angle will be in an interval of 6 fields. More specifically, referring to FIG. 1, a gate control signal (FIG. 2(d)) from gate control circuit 6 which takes a H level at the ratio of once in every three fields is processed by signal processing circuit 52 to be applied to gate circuit 51 as a signal that takes a H level at a ratio of one field to every six fields. Such signal processing circuit can be easily achieved by providing a frequency-divider circuit for ½ frequency-dividing gate control signal and an AND circuit for outputting AND of the output of the frequency-divider circuit and gate control circuit. A vertical synchronizing signal (FIG. 2(b)) from sync separation circuit 4 and delayed by a constant time by delay circuit 50 is applied to gate circuit 51. Gate circuit 51 responds to the above-described frequency-divided gate control signal to pass along the output of delay circuit 50 during the H level period of the frequency-divided gate control signal, i.e. at a period of 6 fields. The passed vertical synchronizing signal is applied to a control signal formation circuit 53 which produces a signal having a duty cycle of 50%, rising in synchronization with the falling of the applied vertical sync signal (FIG. 2 (b)), maintaining a H level over three periods, and then maintaining a L level over three periods, and then maintaining a L level over three periods. The produced signal is supplied as a control signal to be recorded on a magnetic tape by control head 53 at a period of six fields. More specifically, the recording pitch of a control signal in the event of ⅓ field extraction recording becomes:

$$T_c=V_{sp}\times(1/9)\times 6\times(1/60)=V_{sp}/90 \text{ mm}$$

This matches the recording pitch of a control signal in a normal EP mode. This proves that compatibility of a tape having ⅓ field extraction recorded at a speed of $V_{sp}\times(1/9)$ with the EP mode of a VTR of the VHS system is obtained regarding the recording pitch of a control signal.

By selecting fixed contact 15c, i.e. a tape running speed of 1/9 the tape running speed of a SP mode with selecting circuit 15 of FIG. 4 to carry out ⅓ field extraction recording in a time lapse VTR, the H alignment (αH), the track pitch, and the recording pitch of a control signal can be made to coincide with respective values standardized in the EP mode of a conventional VTR in the VHS system. That is to say, a tape having a video signal recorded by a time lapse VTR according to the above-described conditions can be reproduced in an EP mode of a VTR of the VHS system. Thus compatibility of reproduction is guaranteed. In this case, a reproduced picture of triple speed is obtained since a video signal is reproduced at a ratio of one field to three fields at a tape running speed three times that of recording.

The compatibility of a magnetic tape having ⅓ field extraction recorded at the tape running speed of 1/12 the tape running speed $V_{sp}$ of a SP mode of a normal VTR of the VHS system will be described hereinafter. Because a speed of 1/12 the speed $V_{sp}$ of a SP mode corresponds to ¼ the speed $V_{ep}$ of the EP mode, ⅓ field extraction recording results in:

$$\alpha H=0.5H\times(¼)\times 3=0.375H$$

This does not coincide with any of the standard values of the three modes of the VHS system. Furthermore, the tracking pitch is:

$$T_p=T_s\times(1/12)\times 3=T_s\times(¼)=14.5 \text{ μm}$$

which does not match any of the standard values of the three modes of the VHS system. Similarly, the recording pitch $T_c$ of a control signal is:

$$T_c = V_{sp} \times (1/12) \times 6 \times (1/60) = V_{sp}/120 = V_{ep}/40 \text{ mm}$$

which does not match any of the standard values of the three modes of the VHS system. This means that a magnetic tape having ⅓ field extraction recorded at 1/12 the tape speed of a SP mode will not have reproduction compatibility with a normal VTR of the VHS system.

The first embodiment allows reproduction under a predetermined mode of the VHS system even when ⅓ field extraction recording is carried out at a tape running speed of 1/12 the $V_{sp}$ at the time of recording, by slightly modifying the VTR at the reproduction side. This modification includes the tape forwarding amount of field forwarding to be set to ½ (14.5 μm) of the tape forwarding amount L1 (29 μm) in intermittent slow-reproduction or field still-reproduction in a LP mode at the time of carrying out intermittent slow-reproduction or field still-reproduction of one field.

The reason why such a modification allows reproduction by a conventional VTR of the VHS system will be described hereinafter.

In a mode where a control signal is detected at the time of reproduction to carry out field forwarding in a conventional VTR of the VHS system, there is no problem in carrying out field forwarding in a track where a control signal is recorded. However, field forwarding cannot be carried out from a track in which a control signal is recorded to a track in which a control signal is not recorded. In this case, the number of pulses of a FG signal detected by FG detector 10 and that corresponds to the rotation amount of capstan motor 20 is counted by counter 31. When a predetermined value has been reached, i.e. when the tape has been forwarded for a predetermined amount, counter 31 generates a pseudo control signal. More specifically, because the recording pitch of a control signal is $V_{sp} \times 2 \times (1/60) = V_{sp}/30$ mm in a SP mode, counter 31 generates a pseudo control signal when a tape is forwarded by $V_{sp}/60$ mm which is ½ thereof. In an EP mode where the recording pitch of a control signal is $V_{ep}/30$ mm, counter 31 generates a pseudo control signal when the tape is forwarded by $V_{ep}/60$ mm which is ½ thereof. When capstan control circuit 32 detects a pseudo control signal in a manner similar to the case where a true control signal is generated, a break pulse is applied to a driver 19 (FIG. 4) of the capstan motor. Because the recording pitch of a control signal is $V_{ep}/40$ mm, a pseudo control signal must be generated when a tape is forwarded by $V_{ep}/80$ mm in the case of field extraction recording. In order to realized this, the tape should be forwarded by $V_{ep}/2$ mm per field since the following equation (3) is established.

$$\frac{V_{lp}}{2} \times \frac{1}{60} = \frac{V_{sp}}{4} \times \frac{1}{60} = \frac{3V_{ep}}{4} \times \frac{1}{60} = \frac{V_{ep}}{80} \quad (3)$$

Such tape forwarding is realized as set forth in the following. The FG signal detected by FG detector 10 is multiplied by 2, i.e. the frequency is doubled, by a 2-frequency multiplier circuit 30, which is then counted by counter 31. When this count value attains a predetermined value in forwarding one field in a normal LP mode, counter 31 generates a pseudo control signal to provide the same to capstan control circuit 32.

Thus, according to the first embodiment of the present invention, in the event of reproducing a magnetic tape having ⅓ field extraction recorded at a tape speed of 1/12 the tape speed $V_{sp}$ of a SP mode of a VTR of the VHS system, the addition of just one frequency-multiplier circuit 30 allows the recording pitch of a control signal to match the standard value of a LP mode of the VHS system by utilizing the field forwarding control of intermittent slow-reproduction or field still-reproduction of a LP mode, which in turn allows reproduction.

According to the first embodiment of the present invention, by carrying out ⅓ field extraction recording at a tape running speed of 1/9 the standardized tape running speed $V_{sp}$ of a SP mode of the VHS system in a time lapse VTR, a magnetic tape recorded in such a manner can be directly reproduced in an EP mode of a conventional VTR of the VHS system to allow long-time recording while maintaining reproduction compatibility with the VHS system. When ⅓ field extraction recording is carried out at a tape running speed of 1/12 the standardized tape speed $V_{sp}$ in the SP mode in a time lapse VTR, the provision of just one frequency-multiplier circuit in the special reproduction circuit in a LP mode of a VTR of the VHS system allows reproduction of a signal recorded on a magnetic tape in such a manner.

A VTR according to a second embodiment of the present invention will be described hereinafter. The second embodiment relates to a VTR that solves the problem of noise generated by head switching during reproduction of a recording track on a magnetic tape, as described in the section of the Background Art.

Figure 8:
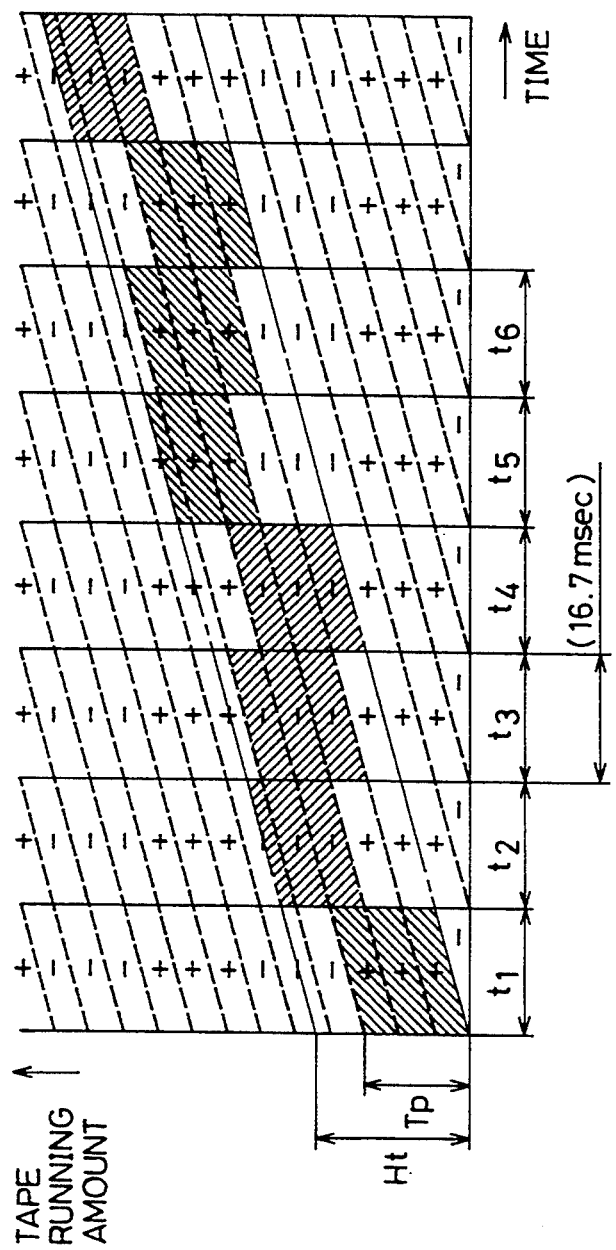
FIG. 8 is a coordinate graph of the recording pattern formed on a tape using the VTR of the first embodiment shown in FIG. 4.

First, a case will be described at the time of reproduction of a tape having a ⅓ field extraction recorded at a tape running speed of 1/12 the tape running speed $V_{sp}$ of the SP mode of the VHS system by a switching operation of selecting circuit 15 using the VTR of the first embodiment shown in FIG. 4. FIG. 8 is a coordinate graph of a recording pattern formed by the above-described condition. The axis of abscissa represents time transition in reproduction, and the axis of ordinates represents the running direction and running amount of the tape during reproduction.

More specifically, each of the time sections $t_1, t_2, t_3, \ldots$ along the abscissa corresponds to the time (16.7 m seconds) of ½ rotation of the rotary cylinder when reproduction is carried out at a tape running speed identical to that of recording. All the columns corresponding to respective time sections show in common the recording pattern formed on the tape. Particularly, the region encircled by a broken line and denoted by "+" indicates a recording region formed by a video head A+ of +azimuth, and the region encircled by a broken line and denoted by "−" indicates a recording region formed by a video head A− of −azimuth. $T_p$ represents the track pitch of recording tracks formed by the head of one azimuth angle (for example +azimuth) without overwriting during recording (for example, corresponding to T1 of FIG. 3). (The broken lines indicate the trace of a recording track that will be formed when continuous recording without field extraction is envisaged.)

The chain dotted line in FIG. 8 indicates the trace of a reproduction head when reproduction is carried out using the aforementioned 4-head cylinder of double-azimuth at a tape running speed identical to that of recording. $H_t$ represents the width of the reproduction head. $H_t$ is less than two times the track pitch $T_p$, and is set to 21.5 μm in the present embodiment.

During each time period of the half rotation of the rotary cylinder, the area of "+" in the region encircled by a chain dotted line represents the amount of output reproduced by a head of +azimuth of the one pair of reproduction heads of opposite azimuth angles, and the area of "−" represents the amount of output reproduced by a head of −azimuth. The region corresponding to an azimuth angle having a greater reproduction output in each time period is indicated by being hatched.

As described in the section of the Background Art, by actually comparing the reproduction outputs obtained from one pair of reproduction heads of different azimuth angles to switch to the output of the head having a greater reproduction output, the reproduction head of +azimuth is selected during the time period $t_1$ of the first half rotation of the cylinder, and the reproduction head of −azimuth is selected at the time period $t_2$ of the next half rotation. This reproduction head switching is carried out by a repetitive pattern of −azimuth, −azimuth, +azimuth, +azimuth, +azimuth ... thereafter. Therefore, according to a repetitive pattern of $+ \to - \to - \to - \to + \to + \to + \to - \to - \to - \to + \to \ldots$, the switching operation of the head can be carried out in order without having to actually compare the reproduction outputs as long as the starting position of reproduction can be identified.

FIGS. 9A–9F schematically show the relationship between a recording track and the trace of a reproduction head in each time period of $t_1$, $t_2$, $t_3$ ... of FIG. 8. FIG. 9A indicates a manner where a reproduction head traces mainly a recording track of +azimuth in time period $t_1$ (the first half rotation of the cylinder).

FIG. 9B shows the reproduction head tracing mainly a recording track of −azimuth in the next time period $t_2$. FIG. 9C shows the reproduction head tracing mainly a recording track of −azimuth in the next time period $t_3$. FIG. 9D shows the reproduction head tracing mainly a recording track of −azimuth in the next time period $t_4$. FIG. 9E shows the reproduction head mainly tracing a recording track of +azimuth in time period $t_5$. FIG. 9F shows the reproduction head tracing mainly the recording track of +azimuth in time period $t_6$.

Figure 10:
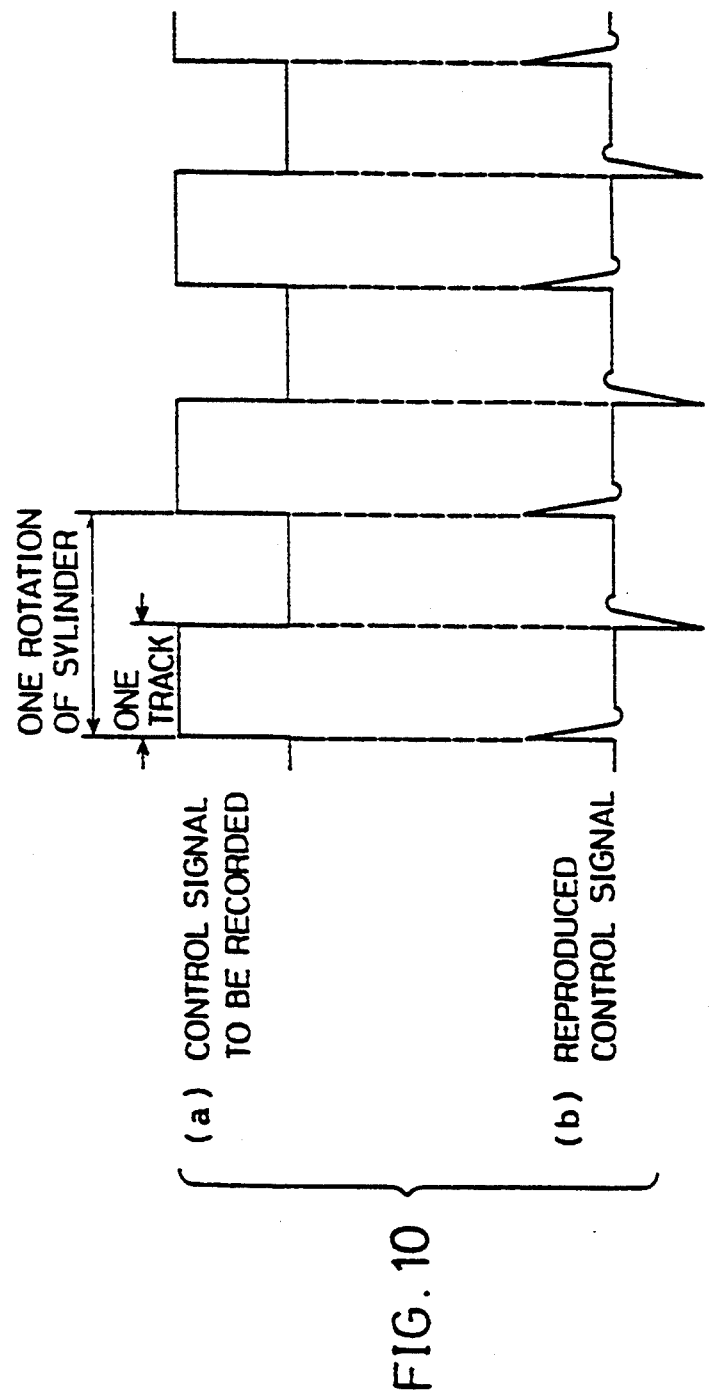
FIG. 10 is a waveform diagram showing a general control signal to be recorded and a reproduced control signal.

When recording is carried out in a normal mode, a magnetic tape has a control signal recorded at a prescribed relationship so that the rising edge thereof occurs every other track of a recording pattern of a video signal, as a servo reference signal for tracing accurately a recording track at the time of reproduction, as already described in the first embodiment. FIG. 10(a) shows such a control signal to be recorded in a normal mode, which is a rectangular wave having a period of 1/10 seconds. This control signal is reproduced as a differential waveform as shown in (b) in FIG. 10. Only the positive pulse of the reproduced signal corresponding to the rising edge of the control signal is used as the reference signal for servo.

Because the recording pattern formed on a tape has a constant relationship with the rising edge of the control signal, the relationship of the position between the recording pattern and the reproduction head at the time of detecting a positive pulse can be determined in a one-to-one correspondence. Particularly in the case of ⅓ field extraction recording described in the first embodiment, an operation will be repeated as set forth in the following because the reproduced control signal is detected by every 6 fields. For example, if the relationship between a recording pattern and the trace of a reproduction head when a positive pulse is detected is set as shown in FIG. 9A, a reproduction head of +azimuth is selected as the reproduction head at positive pulse detection, then the head of −azimuth is selected repeatedly for three times, followed by a head of +azimuth selected repeatedly for two times, followed by detection of a positive pulse at the time of selecting the next head of +azimuth.

Therefore, in response to detection of a rise (positive pulse) of a control signal, the reproduction head to be selected at the time of initiating reproduction can be determined in one-to-one correspondence to either +azimuth or −azimuth. By switching regularly the head according to the above-described predetermined pattern after detection of a control signal, the head having a greater reproduction output can be selected automatically without having to actually compare the reproduction outputs each time.

Figure 11:
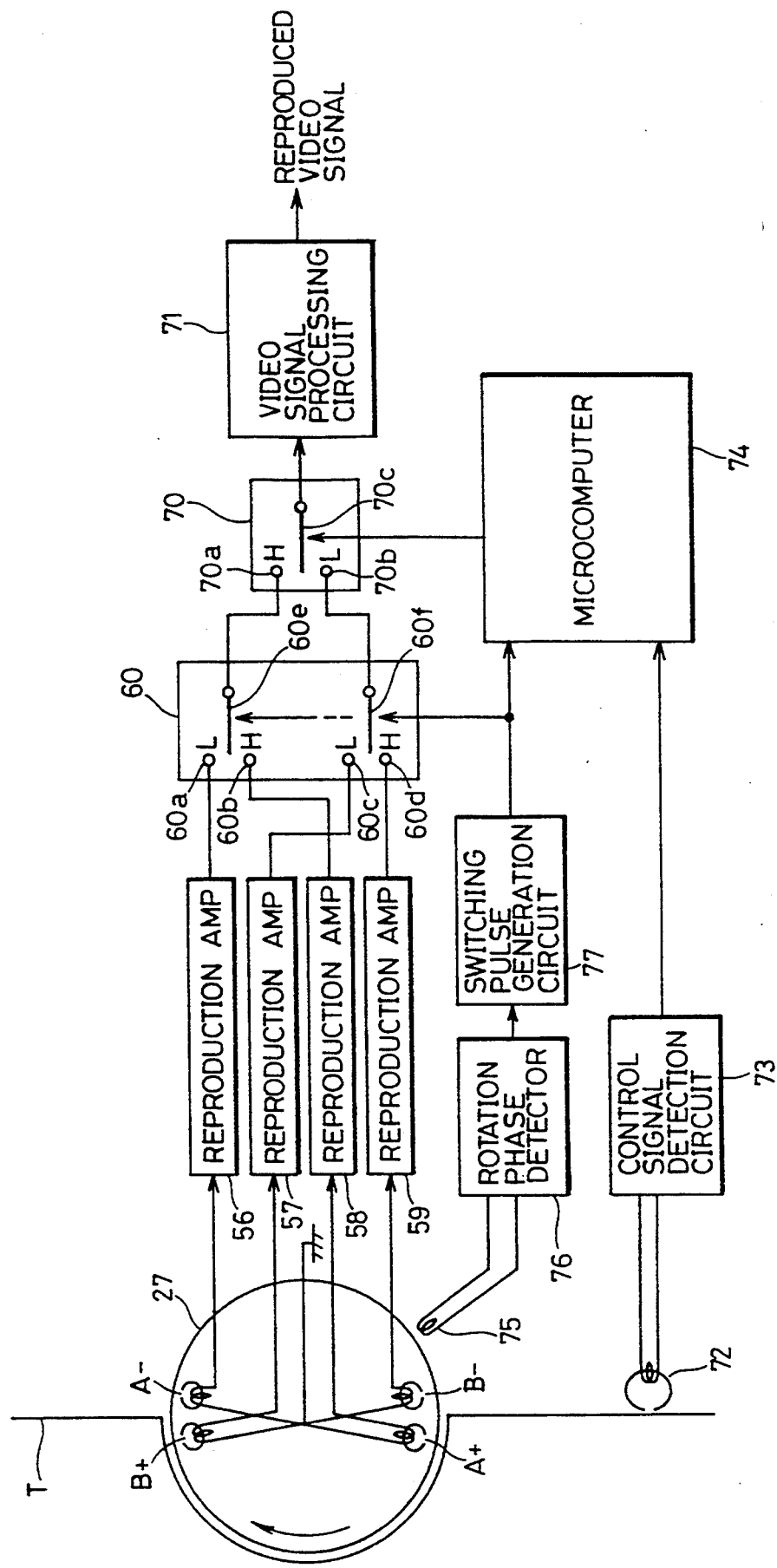
FIG. 11 is a block diagram schematically showing the reproduction system of a VTR according to a second embodiment of the present invention.

FIG. 11 is a block diagram specifically showing the reproduction system of the VTR according to the second embodiment of the present invention for carrying out reproduction head switching in the above-described manner. Referring to FIG. 11, a magnetic tape T having field extraction recorded is wound around half the periphery of a 4-head cylinder 27 of double-azimuth.

At the time of recording, a pair of heads A+, A− of different azimuth angles carry out recording alternately, and a control signal is recorded at the control track of tape T at the timing of recording a video signal with head A+.

At the time of reproduction, in addition to the above-described one pair of heads A+ and A−, a head B+ having an azimuth angle identical to that of head A+ and disposed in the vicinity of head A−, and a head B− having an azimuth angle identical to that of head A− and disposed in the vicinity of head A+ are used. The reproduced output from head A− is amplified by a reproduction amplifier 56 and then applied to a fixed contact 60a of a first switching circuit 60. The reproduced output from head B+ is amplified by a reproduction amplifier 57 and then applied to a fixed contact point 60c of switching circuit 60. The reproduced output from head A+ is amplified by a reproduction amplifier 58 and then applied to a fixed contact 60b of switching circuit 60. The reproduced output from head B− is amplified by a reproduction amplifier 59 and then applied to a fixed contact 60d of switching circuit 60.

One movable armature 60e of first switching circuit 60 responds to a switching pulse provided from a switching pulse generation circuit 77 which will be described afterwards to select either fixed contact 60a or fixed contact 60b. The other movable armature 60f also responds to this switching pulse to select either fixed contact 60c or fixed contact 60d. More specifically, when the switching pulse is at a low level, movable armatures 60e and 60f are selectively connected to fixed contacts 60a and 60c, respectively. When the switching pulse it at a high level, movable armatures 60e and 60f are selectively connected to fixed contacts 60b and 60d, respectively.

Regarding the outputs of the first switching circuit, the output from movable armature 60e is applied to one fixed contact 70a of a second switching circuit 70, and the output from movable armature 60f is applied to the other fixed contact 70b of second switching circuit 70.

Movable armature 70c of second switching circuit 70 responds to a switching control signal provided from a microcomputer 74 which will be described afterwards to select one of fixed contacts 70a and 70b. The output from movable armature 70c of switching circuit 70 is applied to a video signal processing circuit 71 to be subjected to a well-known reproduced signal process and then provided as a reproduced video signal.

The control signal recorded on tape T is reproduced by a control head 72 to be applied to a control signal detection circuit 73. A reproduced control signal shown in FIG. 12 (a) is provided from control signal detection circuit 73 to be applied to microcomputer 74.

A PG detection coil 75 serves as a rotation phase detector for magnetically detecting the rotation state of cylinder 27, and provides one pulse for each rotation of the rotor of cylinder 27. In the present embodiment, it is assumed that the relationship of the position between the PG detection coil and each head is predetermined so that a PG pulse is generated when tracing of a recording track is initiated where video head A+ is under the state of FIG. 9A.

A PG pulse obtained in such a manner is applied to a switching pulse generation circuit 77. Switching pulse generation circuit 77 responds to this PG pulse to synchronize with the rotation phase of cylinder 27. More specifically, in synchronization with the rising edge of a PG pulse, a switching pulse (FIG. 12(c)) is generated of duty cycle 50% with the time required for one rotation of cylinder 27 as one period. In response to this switching pulse, switching-control of movable armatures 60e and 60f of first switching circuit 60 is carried out, whereby the output of either one pair of heads A−, B+ or heads A+, B− is provided from switching circuit 60.

The switching pulse from switching pulse generation circuit 77 is also applied to microcomputer 74. In response, microcomputer 74 generates a switching control signal as shown in FIG. 12(b), which is applied to second switching circuit 70. More specifically, microcomputer 74 synchronizes with detection of a reproduced control signal (FIG. 12(a)) which is a positive pulse from control signal detection circuit 73 to generate a switching control signal (FIG. 12(b)) of a H level. When the switching pulse provided from switching pulse generation circuit 77 changes from a H level to a L level, or from a L level to a H level, a switching control signal of a H level is generated two times continuously, and then that of a L level is generated once in synchronization with respective edges, as:

H→H→L→H→H→L→H→...

which is shown in FIG. 12(b).

Therefore, when servo control is carried out using a control signal, the relationship between the head and recording pattern when a positive pulse control signal is detected can be determined in one-to-one correspondence according to the position relationship between the PG detector and head. For example, if the reproduction state by head A+ is set to the state as shown in FIG. 9A, head A+ will always trace a recording track in such a manner as shown in FIG. 9A when a control signal of a positive pulse is detected.

The operation of the embodiment of FIG. 11 will be described in details hereinafter with reference to FIG. 12.

When servo control of a cylinder and a capstan is initiated in a reproduction mode, head A+ (and B−) traces a recording track under the state of FIG. 9A. Here, the movable armatures 60e, 60f of first switching circuit 60 are switched to the H side, i.e. the sides of fixed contacts 60b and 60d, respectively.

A reproduced control signal of a H level is applied to microcomputer 74 from control signal detection circuit 73. In response, microcomputer 74 generates a switching control signal (b) of a H level. Movable armature 70c of second switching circuit 70 switches to the H side, i.e. the side of fixed contact 70a. Thus, as shown in FIG. 12 (d), reproduced signal from head A+ is applied to video signal processing circuit 71 to output a reproduced video signal.

When cylinder 27 makes a half rotation and heads A− and B+ come to the position of tracing tape T, the switching pulse attains a L level as shown in FIG. 12(c), whereby movable armatures 60e and 60f of first switching circuit 60 are switched to the L side i.e. to the sides of fixed contacts 60a and 60c. At the same time, microcomputer 74 maintains a switching control signal of a H level, and movable armature 70c of second switching circuit 70 is still connected to the side of fixed contact 70a. Thus, a signal from head A− is applied to video signal processing circuit 71, as shown in FIG. 12(d), to realize the state shown in FIG. 9B.

Then, when cylinder 27 takes a further half rotation so that heads A+ and B− come to the position of tracing tape T, the switching pulse attains a H level as shown in FIG. 12(c), whereby movable armatures 60e and 60f of first switching circuit 60 switches to the H side, i.e. to the sides of fixed contacts 60b and 60d. At the same time, microcomputer 74 provides a switching control signal (b) of a L level, whereby movable armature 70c of second switching circuit 70 switches to the side of fixed contact 70b. As shown in FIG. 12(d), a signal from head B− is supplied to video signal processing circuit 71 to realize the state shown in FIG. 9C.

Cylinder 27 takes a further half rotation, and when heads A− and B+ come to the position of tracing tape T, the switching pulse attains a L level as shown in FIG. 12(c). Movable armatures 60e and 60f of a first switching circuit 60 switch to the L side, i.e. the sides of fixed contacts 60a and 60c. At the same time, microcomputer 74 provides a switching control signal (b) of a H level, whereby fixed armature 70c of second switching circuit 70 switches to the side of fixed contact 70a. As shown in FIG. 12(d), a signal from head A− is applied to video signal processing circuit 71 to realize the state shown in FIG. 9D.

Then, when heads A+ and B− come to the position of tracing tape T, the switching pulse attains a H level as shown in FIG. 12(c). Movable armatures 60e and 60f of first switching circuit 60 are switched to the H side, i.e. to the sides of fixed contacts 60b and 60d. At the same time, microcomputer 74 maintains a switching control signal (b) of a H level, and movable armature 70c of second switching circuit 70 is connected to the side of the fixed contact 70a. Thus, as shown in FIG. 12(d), a signal from head A+ is applied to video signal processing circuit 71 to realize the state of FIG. 9E.

When cylinder 27 takes a further half rotation and heads A− and B+ come to the position of tracing tape T, the switching pulse attains a L level as shown in FIG. 12(c). Movable armatures 60e and 60f of first switching circuit 60 are switched to the L side, i.e. the sides of fixed contacts 60a and 60c. At the same time, microcomputer 74 provides a switching control signal (b) of a L level, whereby movable armature 70c of second switching circuit 70 is switched to the side of fixed contact 70b. As shown in FIG. 12(d), a signal from head B+ is applied to video signal processing circuit 71 to realize the state of FIG. 9F.

When cylinder 27 further takes a half rotation and heads A+ and B− come to the position of tracing tape T, the switching pulse attains a H level as shown in FIG. 12(c). Movable armatures 60e and 60f of first switching circuit 60 are switched to the H side, i.e. to the sides of fixed contacts 60b and 60d. At the same time, microcomputer 74 provides a switching control signal (b) of a H level, whereby movable armatures 70c of second switching circuit 70 switches to the side of fixed contact 70a. As shown in FIG. 12(d), a signal from head A+ is applied to video signal processing circuit 71 to realize again the state of FIG. 9A. A similar operation is repeated thereafter.

In summary, when a reproduced control signal of a positive pulse is detected, movable armature 70c of second switching circuit 70 is switched to the side of fixed contact 70a. Then, according to a preset algorithm in microcomputer 74, the level of the switching control signal to second switching circuit 70 is repeatedly switched in the order of H→H→L→H→H→H→L→H→H→L in synchronization with the switching timing of movable armatures 60e and 60f of first switching circuit 60 to the L side or H side as shown in FIG. 12(b). Thus, the reproduction head can be selectively switched to that of the greater reproduction output without having to monitor the envelope of the reproduced output of each head as in the prior art.

The above-described second embodiment is not limited to the recording/reproduction tape running speed set to 1/12 of the SP mode of the VHS system. The present invention is applicable to the case where, for example, movable armature 15a of selecting circuit 15 of FIG. 4 is switched to fixed contact 15c, and reproduction is carried out of a tape in which recording is carried out where the tape speed of recording is set to 1/9 of the SP mode. Furthermore, although the above second embodiment was described where field extraction recording was carried out at a ratio of one field to every three fields, the present invention is not limited to field extraction recording of this ratio, and any ratio is allowed where odd number fields and even number fields of an original video signal are eventually extracted and recorded alternately, such as one field for every five fields or one field for every seven fields.

Figure 12:
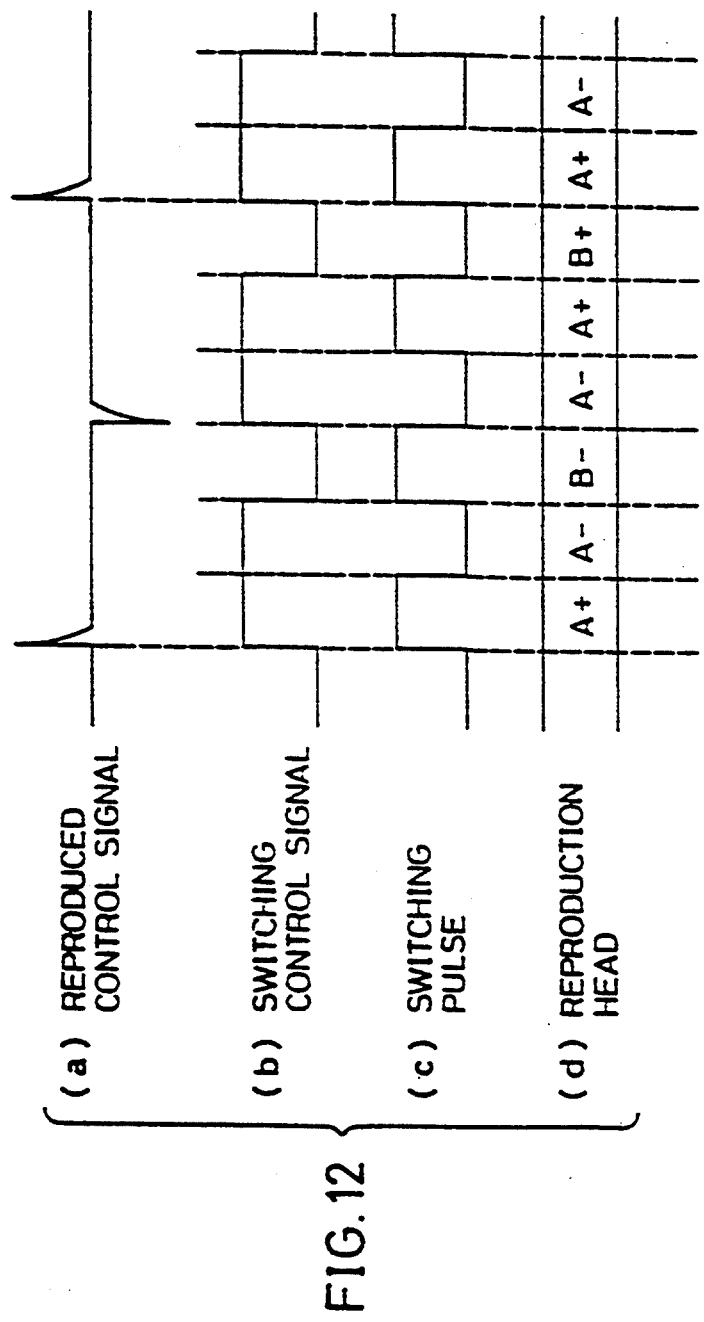
FIG. 12 is a timing chart for describing the operation of the second embodiment of FIG. 11.

In the second embodiment, the present invention was described on the basis of a VTR having the recording timing of a control signal set so that the rising edge (positive pulse) of a reproduced control signal (a) and the edge of a switching pulse (c) match, as shown in FIG. 12. However, a common VTR of the VHS system generally has a control signal recorded so that there is an appropriate phase difference between the rising edge of a reproduced control signal and the edge of a switching pulse. In order to maintain compatibility between the VTR of the above-described second embodiment and a normal VTR of the VHS system, it is necessary to achieve recording so that there is an appropriate phase difference between the edges of a control signal and a switching pulse at the time of recording.

A third embodiment of the present invention will be described hereinafter where an appropriate phase difference is established between a reproduced control signal and a switching pulse.

Figure 13:
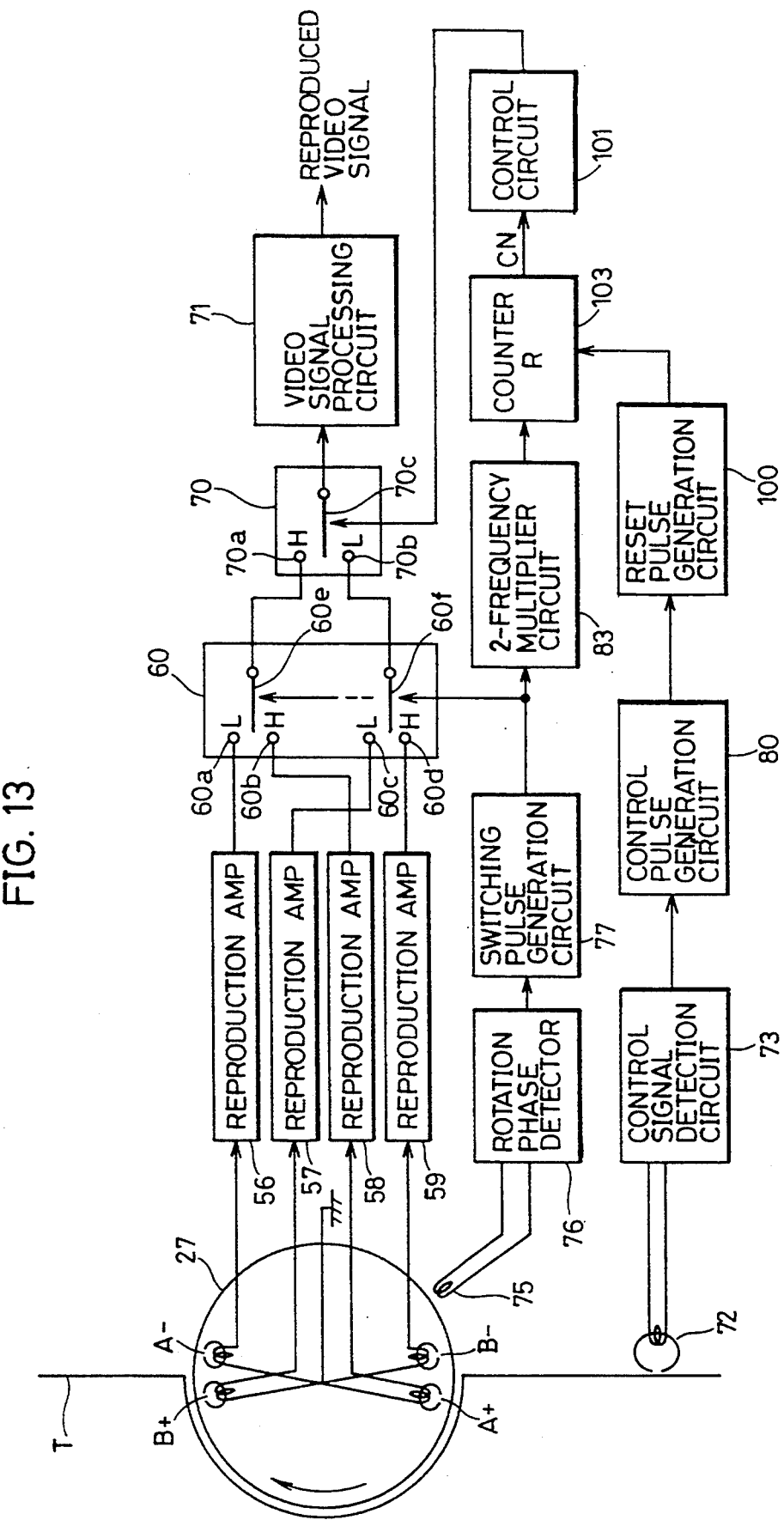
FIG. 13 is a block diagram schematically showing the reproduction system of a VTR according to a third embodiment of the present invention.

FIG. 13 is a block diagram showing the reproduction system of the VTR of the second embodiment. Components common to the second embodiment of FIG. 11 will not have their description repeated.

Figure 14:
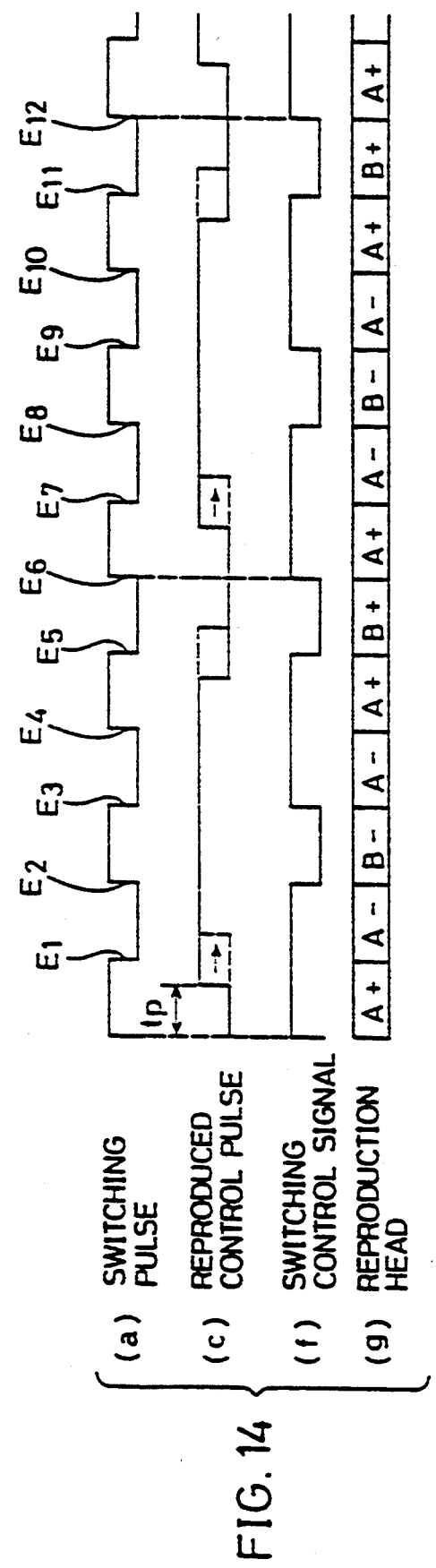
FIG. 14 is a timing chart for describing the operation of third embodiment shown in FIG. 13.

In the third embodiment, the rising edge of a reproduced control pulse (c) is generated as delayed by a time period to with respect to edge of a switching pulse (a) as shown in FIG. 14. It is to be noted that this reproduced control pulse (c) is a signal that is waveform-shaped so that it rises at the edge of the positive direction and falls at the edge of the negative direction of the reproduced control signal of FIG. 12. The timing of head switching is directly defined only by the rising edge itself of a reproduced control pulse., and is not dominated by the duty cycle.

Referring to FIG. 13, a control pulse generation circuit 80 generates a reproduced control pulse (FIG. 14(c)) that rises and falls at the outputs of the positive direction and the negative direction, respectively, of a reproduced control signal provided from control signal detection circuit 73. The generated reproduced control pulse is applied to a reset pulse generation circuit 100. The switching pulse (a) generated by switching pulse generation circuit 77 is applied to a 2-frequency multiplier circuit 83 instead of to microcomputer 74 of FIG. 11, in which the frequency is multiplied by 2.

Reset pulse generation circuit 100 responds to a rising edge of a reproduced control pulse (c) to provide a reset pulse. In response, a counter 103 counting the number of pulses from 2-frequency multiplier circuit 83 is reset. The count value of counter 103 is applied to control circuit 101.

Counter 103 counts up only the rising edges of an input pulse. By multiplying by 2 the switching pulses (a) with 2-frequency multiplier circuit 83, the output therefrom exhibits a rising edge at the timing corresponding to each of the rising and falling edges of a switching pulse (a). As a result, counter 103 will substantially count up both edges of the rise and fall of a switching pulse (a). An edge detection circuit providing one pulse for each edge of a switching pulse irrespective of its rise or fall may be used instead of this 2-frequency multiplier circuit 83.

Control circuit 101 monitors the count value CN of counter 103. When the count value CN becomes 2 after reset of counter 103 by a rise of a reproduced control pulse (c), that is to say, in accordance with the second edge E2 of the switching pulse from the rising edge of a reproduced control pulse, the level of the switching control signal output from control circuit 101 changes from a H level to a L level. Control circuit 101 functions thereafter to cause change in the level of the switching control signal according to a predetermined rule. For example, when the count value CN becomes 3, i.e. at the third edge E3, the switching control signal attains a H level from a L level; when the count value CN becomes 5, i.e. at the fifth edge E5, the switching control signal attains a L level from a H level; and when the count value CN becomes 6, i.e. at the sixth edge E6, the switching control signal attains a H level from a L level. After the next rising edge of the reproduced control pulse, level change in a switching control signal is carried out according to the above-described rule. More specifically, at edge E8, to the L level; at edge E9, to the H level; at edge E11, to the L level; and at edge E12, to the H level. The operation of control circuit 101 can be carried out in a software manner using a microcomputer.

Similar to the switching control signal from microcomputer 74 in the second embodiment of FIG. 11, the switching control signal from control circuit 101 controls the switching of second switching circuit 70. Eventually, the reproduction head selected by the switching of first and second switching circuits 60 and 70 is as shown by the sequence of FIG. 14(g). Thus, the third embodiment shown in FIG. 13 maintains a selection sequence of a reproduction head identical to the case of the second embodiment shown in FIG. 12.

In the above-described third embodiment, a control signal is recorded on a tape or reproduced from a tape by a fixed head differing from a video signal head mounted in the rotary cylinder for recording/reproducing a video signal. If positioning of a video signal track formed on a tape and the trace of a rotary head is to be carried out according to the position of a control signal by a phase control circuit at the time of reproduction, tracking adjustment is required to maintain compatibility between a plurality of VTRs taking into consideration the assembly precision of the fixed head and the rotary head.

Figure 15:
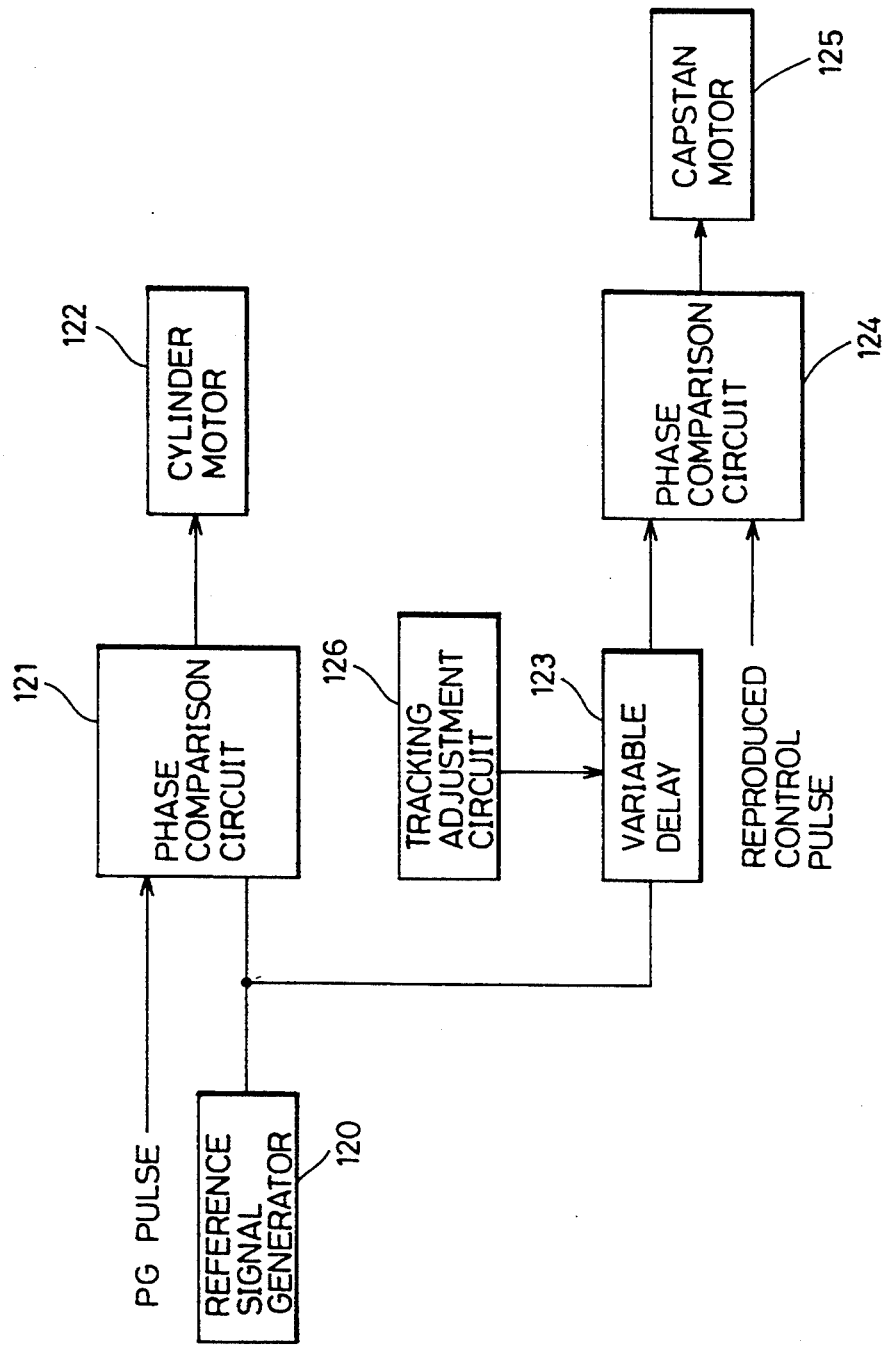
FIG. 15 is a block diagram schematically showing a tracking adjustment circuit of a conventional VTR.

Here, the principle of tracking adjustment will be described briefly. FIG. 15 is a block diagram showing circuitry for carrying out phase-control of a cylinder motor 122 driving a cylinder and a capstan motor 125 for driving a capstan for tape travel. A reference signal generator 120 generates a reference signal of 30 Hz. This reference signal has its phase compared with a PG pulse obtained from PG detection coil 75 (FIG. 13) in a phase comparison circuit 121. The phase difference therebetween is supplied to cylinder motor 122 as cylinder phase error to carry out phase-control of the cylinder.

The reference signal from reference signal generator 120 is delayed by a variable delay time DT by a variable delaying circuit 123. The delayed reference signal has its phase compared by a phase comparison circuit 124 with the rising edge of a reproduced control pulse obtained from control pulse generation circuit 80 (FIG. 13). The phase difference therebetween is supplied to capstan motor 125 as a capstan phase error to carry out phase-control of the capstan.

Delay time DT is a variable time period determined by tracking adjustment circuit 126 formed by a variable resistor or the like. At the time of tracking adjustment, the user manually operates tracking adjustment circuit 126 to obtain an arbitrary delay time DT. By this tracking adjustment, the phase of the reference signal is changed by an arbitrary amount, whereby phase offset between a plurality of VTRs due to assembly accuracy of fixed and rotary heads is adjusted to maintain compatibility. Although not shown in FIG. 15, a speed error signal from a speed control circuit may be supplied to cylinder motor 122 and capstan motor 125 to carry out speed control similar to that of a well known VTR.

In FIG. 15, the phase of a reference signal is changed by passing a reference signal through variable delay circuit 123. Alternatively, a reference signal may be directly entered into phase comparison circuit 124 and a reproduced control pulse may be passed through variable delay circuit 123 to change the phase of a reproduced control pulse. The same effect can be obtained in this case.

When the above-described tracking adjustment is carried out in the above third embodiment, there is a disadvantage of the selected head differing depending upon whether adjustment is carried out or not. Such a disadvantage by tracking adjustment will be described with reference to FIGS. 14 and 16.

According to the head switching process shown in the third embodiment, it is assumed that a switching pulse (a) and a reproduction control pulse (c) have the phase relationship shown in FIG. 14. Because compatibility is required between the equipments, it is assumed that the above-described tracking adjustment is carried out to change the phase relationship between a switching pulse (a) and a control pulse (c) as indicated by the arrow in FIG. 14, so that an optimum tracking state is obtained where the edge of the reproduced control pulse is at the position indicated by the broken line (c) in FIG. 14, i.e. at the position where the rising edge of the reproduced control pulse located preceding edge E1 of the switching pulse is shifted behind E1.

Figure 16:
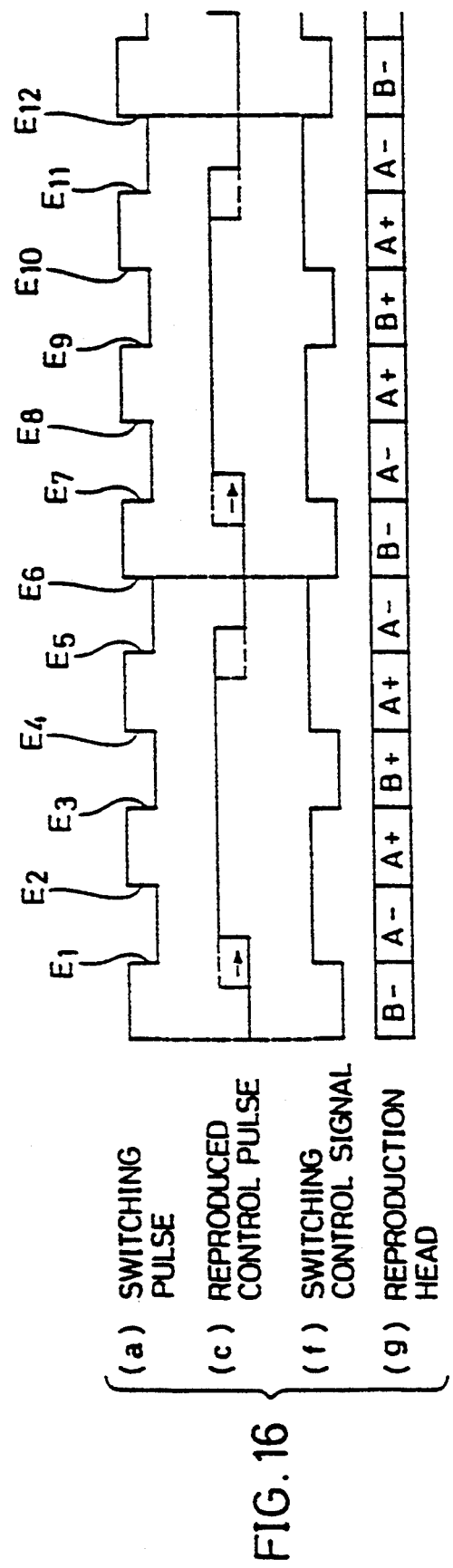
FIG. 16 is a timing chart for describing the operation of the third embodiment shown in FIG. 13 when tracking control is carried out.

FIG. 16 is a timing chart showing the relationship of various signals after carrying out such a tracking adjustment. The solid line and broken line of the edge portion of a reproduced control pulse (c) of FIG. 16 correspond to the respective broken line and solid line of the same portions of the reproduction control pulse (c) of FIG. 14. A case is assumed where the circuit of FIG. 13 is operated according to the switching pulse (a) and the reproduction control pulse (c) having the phase relationship shown in FIG. 16. Because a switching control signal, i.e. a head selecting signal (f) is a signal inverted according to a predetermined rule by counting both the rising and falling edges of the switching pulse with the rise of the reproduced control pulse (c) as the origin, a head selecting signal will be generated at a phase differing from an originally desired one as shown in FIG. 16(f) when the position of the rising edge of the control pulse is shifted exceeding the switching pulse edge as described above. Therefore, the order of the selected heads differs from an originally desired one as shown in FIG. 16(g).

More specifically, when the count value CN of counter 103 becomes 2, i.e. at the second edge E3 of the switching pulse from the rising edge of the reproduced control pulse (c), control circuit 101 of FIG. 13 changes the level of the switching control signal output to a L level from a H level. Then, at CN=3, i.e. at the third edge E4, the switching control signal attains a H level from a L level; at CN=5, i.e. at the fifth edge E6, the switching control signal changes from a H level to a L level; at CN=6, i.e. at the sixth edge E7, the switching control signal changes from a L level to a H level. Therefore, the reproduction head is selected as shown in FIG. 16(g). It is to be noted that the order shown in FIG. 16(g) differs from the original order shown in FIG. 14(g).

This means that a tracking adjustment will negate the advantage of the present invention where a reproduction head is always selected according to a predetermined order without having to detect reproduction output when reproducing from the same magnetic tape by selecting a reproduction head according to a predetermined rule.

A fourth embodiment will be described hereinafter in which a control signal is formed for head switching without the above-described disadvantage. In the fourth embodiment, the phase offset due to tracking adjustment between the reproduced control pulse and the switching pulse is within the range of one period of the switching pulse, and the number of times that the timing of the rising edge of the reproduced control pulse matches the timing of a rising or falling edge of the switching pulse within the range of the tracking adjustment is not more than once.

In the following fourth embodiment, a rising or falling edge of the switching pulse that is not included within the above-described range of tracking adjustment and that has certain constant position relationship from the reference side edge (rising edge) of the reproduced control pulse is detected out of the rising and falling edges of the switching pulse. With this detected edge as the origin, a control signal changing in level according to a predetermined rule, i.e. a switching signal, is formed. Therefore, if the amount of tracking adjustment, i.e. the changing amount of the phase relationship between the reproduced control pulse and the switching pulse by tracking adjustment, is within the above-described range, a switching signal that maintains the original optimum head selecting order can be formed independent of change in phases between these signals.

Figure 17:
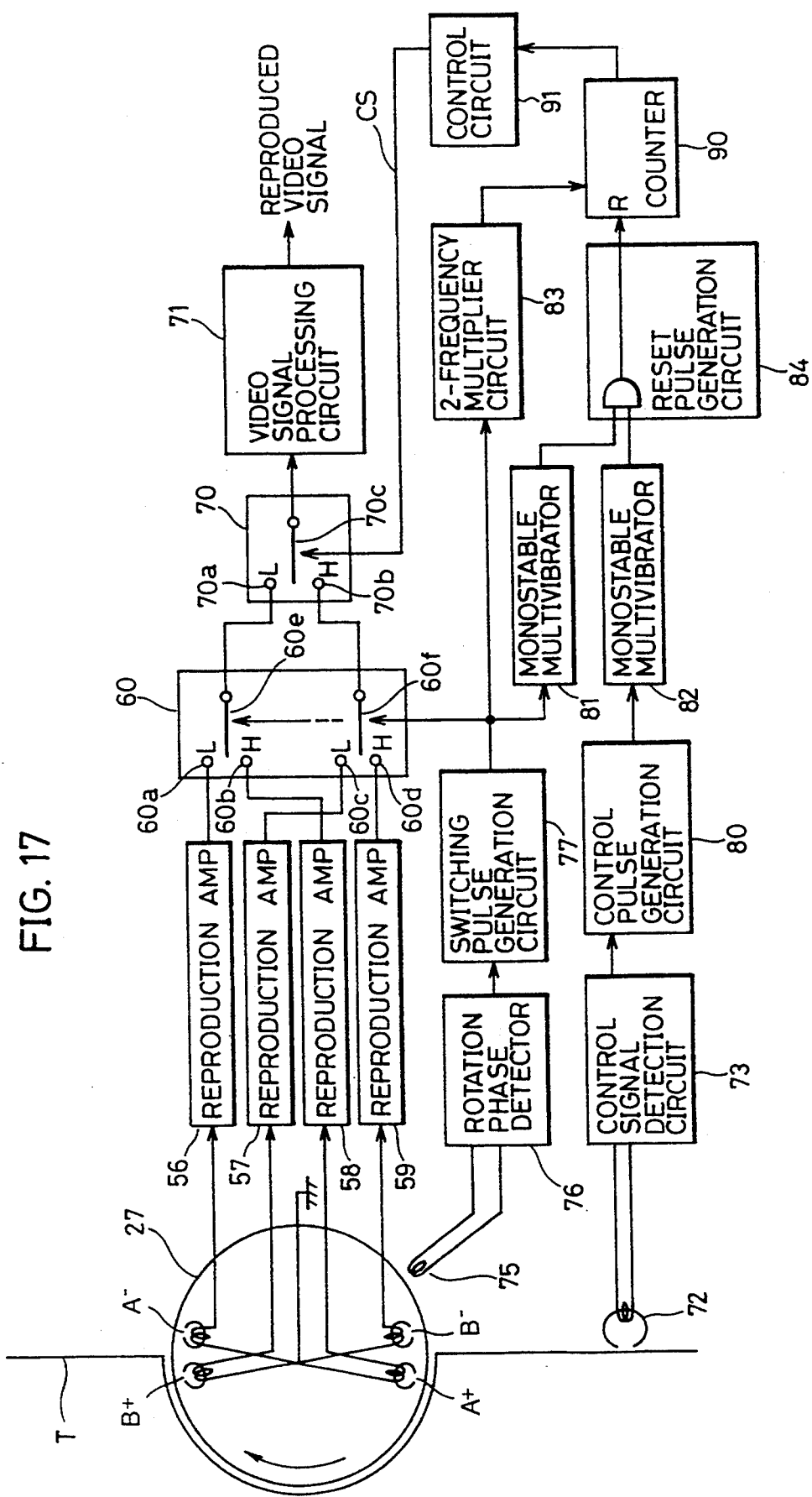
FIG. 17 is a block diagram schematically showing the reproduction system of a VTR according to a fourth embodiment of the present invention.
Figure 18:
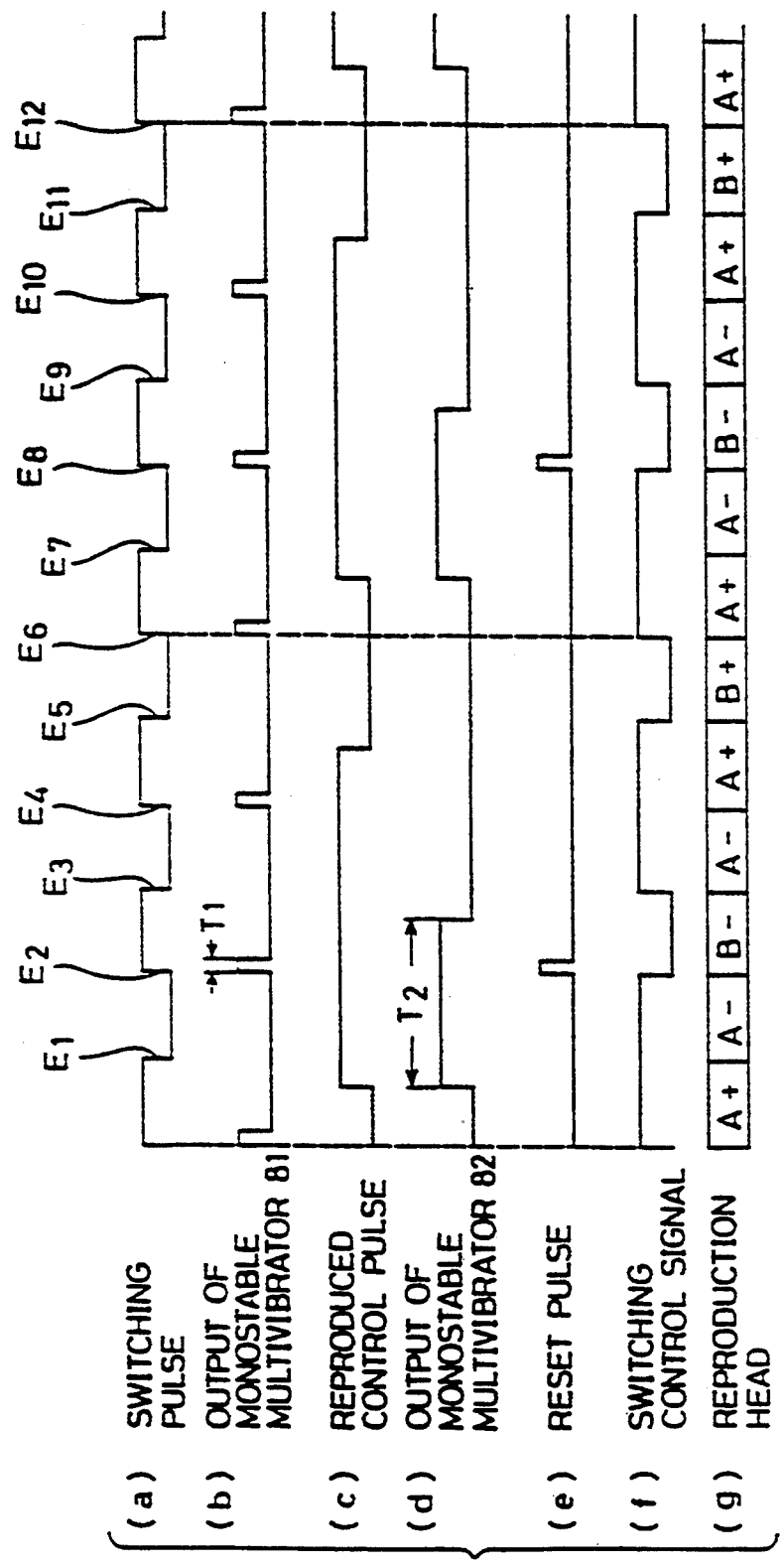
FIGS. 18 and 19 are timing charts for describing the operation of the fourth embodiment shown in FIG. 17.

FIG. 17 is a block diagram showing the reproduction system of a VTR according to the fourth embodiment of the present invention. FIG. 18 is a timing chart showing the operation thereof. The components in FIG. 17 corresponding to those in FIGS. 11 and 13 have the same reference character denoted, and their description will not be repeated. It is assumed that the conditions of the above-described tracking adjustment range are applied also in the following description.

Referring to FIG. 17, a monostable multivibrator 81 generates a first pulse of a width T1 as shown in FIG. 18(b) with the rising edge of a switching pulse (FIG. 18(a)) provided from switching pulse generation circuit 77 as the origin. A monostable multivibrator 82 generates a second pulse of a width T2 corresponding to one period of a switching pulse as shown in FIG. 18(d) with the rising edge of the reproduced control pulse (FIG. 8(c)) generated by control pulse generation circuit 80 as the origin.

Pulses (b) and (d) provided from monostable multivibrators 81 and 82 are fed to an AND gate forming a reset pulse generation circuit 84 to be ANDed. As a result, the AND gate is opened only during time period T2 of a H level of a third pulse. Only the first of a plurality of the first pulses generated after detection of a rising edge of the reproduced control pulse (c) is extracted as shown in FIG. 18(e). This pulse is supplied to reset pulse generation circuit 84 as a reset pulse.

The reset pulse from reset pulse generation circuit 84 resets a counter 90 that counts the rising edges of an output obtained by multiplying by 2 the switching pulse (a) with a 2-frequency multiplier circuit 83. Therefore, counter 90 counts both the rising and falling edges of the switching pulse after the reset pulse is entered.

Control circuit 91 monitors the count value of counter 90. When the count value N of counter 90 is 1 as shown in FIG. 18(f), i.e. at edge E3 of the first switching pulse generated after a reset pulse, the level of a switching control signal SC which is an output signal changes to a H level from a L level. When N=3, i.e. at the third edge E5 after the reset pulse, switching control signal CS attains a L level from a H level; when N=4, i.e. at the fourth edge E6 after the reset pulse, switching control signal CS attains a H level from a L level; when N=6, i.e. at the sixth edge E8 after the reset pulse, switching control signal CS attains a L level from a H level. Control circuit 91 operates to invert regularly switching control signal CS according to a predetermined rule. When the next reset pulse is input, a similar operation is repeated.

A generated control signal CS is supplied to second switching circuit 70 as a head selecting signal, whereby the reproduction head is selected regularly according to a predetermined order as shown in FIG. 18(g). Similar to the third embodiment, control circuit 91 can be realized in a software manner using a microcomputer.

Figure 19:
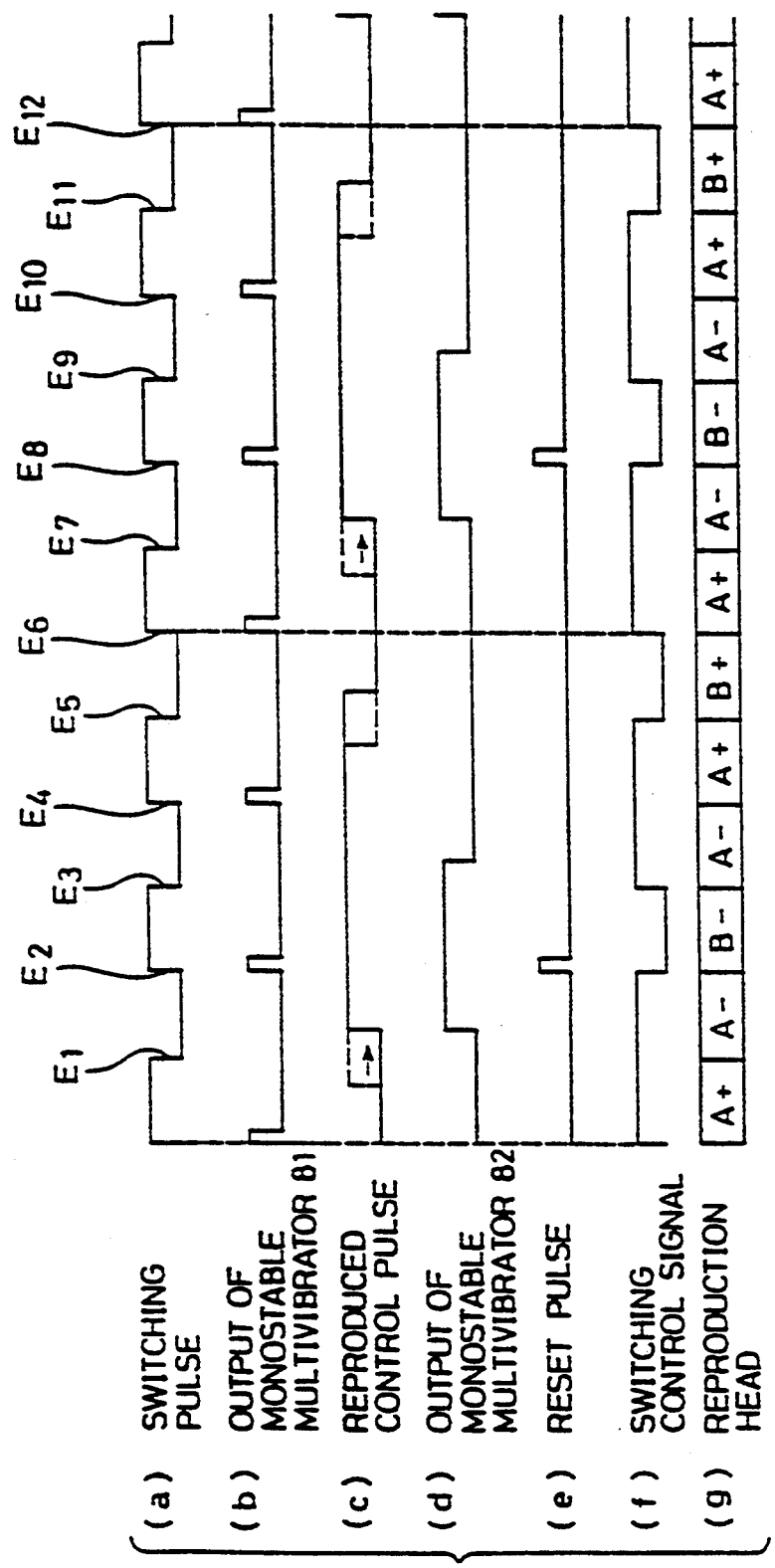

The above-described structure gives the advantage that, even when tracking adjustment is carried out to shift the reproduced control pulse (c) in the direction of the arrow with respect to the switching pulse (a), and the rising edge of the reproduced control pulse (c) is shifted succeeding the edge E1 from the preceding position of switching pulse (a), the position of generation of a reset pulse (e) does not differ from the case where tracking adjustment is not carried out (FIG. 18), and the switching control signal CS shown in FIG. 19(f) is identical to the switching control signal of FIG. 18(f). As a result, it is apparent from FIG. 18(g) and FIG. 19(g) that an identical selecting order of the reproduction head is maintained independent of tracking adjustment. A tracking adjustment will have no influence on selection of the reproduction head in the present embodiment.

In the above-described embodiments, the reproduction head switching is carried out by selecting a reproduction head according to a predetermined rule using a 4-head cylinder of double-azimuth. It is apparent as described in the block diagrams of FIGS. 11, 13 and 17 that the two heads arranged adjacent to each other, i.e. heads A− and B+, or heads A+ and B−, are attached with a predetermined head distance of d therebetween. If these two adjacent heads are to reproduce the same track, there will be a time difference of $t = d/v$ between the reproduced signals obtained from the two heads, where v is the relative speed of the head with respect to the running tape.

Therefore, when switching of the head is carried out from the state in which the succeeding head in contact with the tape is selected to the state in which the preceding head in contact with the magnetic tape is to be selected, the vertical synchronizing signal of a video signal reproduced by the reproduction head will be advanced by a time t from the prescribed period. Thus, there is a problem that irregularity occurs in the vertical direction of the monitor screen when a video signal with an unstable period of a vertical synchronizing signal is reproduced on the screen of a television receiver or a monitor device.

The generation of irregularity in the vertical direction on the monitor screen can be prevented by delaying the reproduced video signal by a time of t to provide a vertical synchronizing signal of a stable period only when the reproduced signal is selected from a preceding head according to a pattern of a preset head selection. The reproduction system of such a VTR will be described hereinafter as the fifth embodiment.

Figure 20:
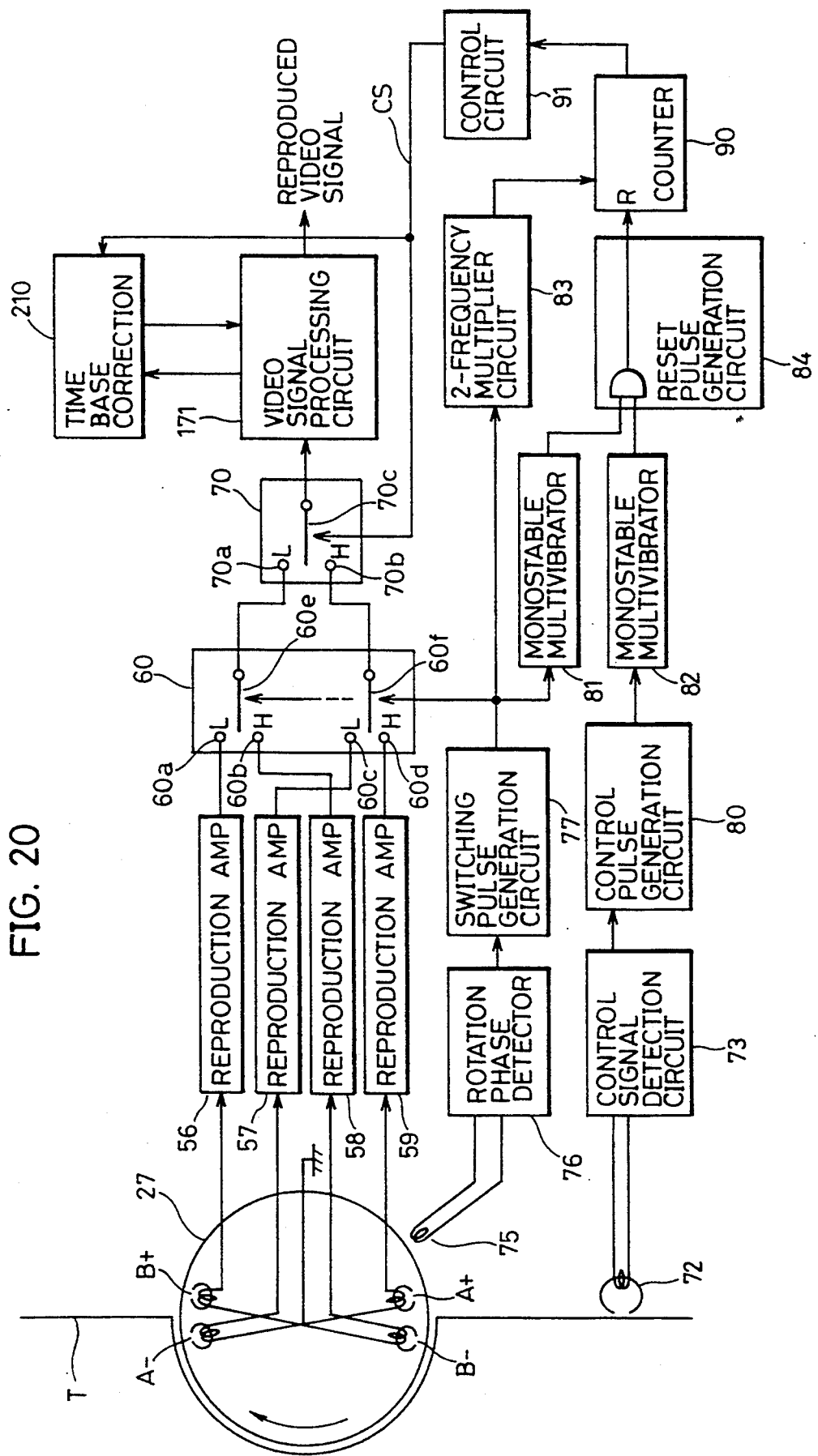
FIG. 20 is a block diagram schematically showing the reproduction system of a VTR according to a fifth embodiment of the present invention.

FIG. 20 is a block diagram of the reproduction system of a VTR according to the fifth embodiment of the present invention. Components identical to those in FIG. 17 have the same reference characters denoted, and their description will not be repeated. Although the embodiment of FIG. 17 was described with heads A− and A+ as the preceding heads, the fifth embodiment has the position relationship of heads A− and B+ and heads A+ and B− opposite to the position relationship in FIG. 17. Thus, head B− precedes head A+, and head B+ precedes head A−.

Reproduced signals from heads B+, A−, B−, and A+ are applied to reproduction amplifiers 56, 57, 58 and 59, respectively, to be amplified. The reproduced outputs of heads B+, A−, B−, A+ are provided to fixed contacts 60a, 60c, 60b, 60d of first switching circuit 60, respectively. Identical to movable armatures 60e and 60f of FIG. 17, movable armatures 60e and 60f are controlled by a switching pulse from switching pulse generation circuit 77. More specifically, movable armature 60e selects one of fixed contacts 60a and 60b according to the switching pulse, and movable armature 60f selects one of fixed contacts 60c and 60d according to the switching pulse. When the switching pulse attains a L level, movable armature 60e is selectively connected to fixed contact 60a. At the same time, movable armature 60f is selectively connected to fixed contact 60c. When the switching pulse attains a High level, movable armature 60e is selectively connected to fixed contact 60b, and movable armature 60f is selectively connected to fixed contact 60d.

Figure 21:
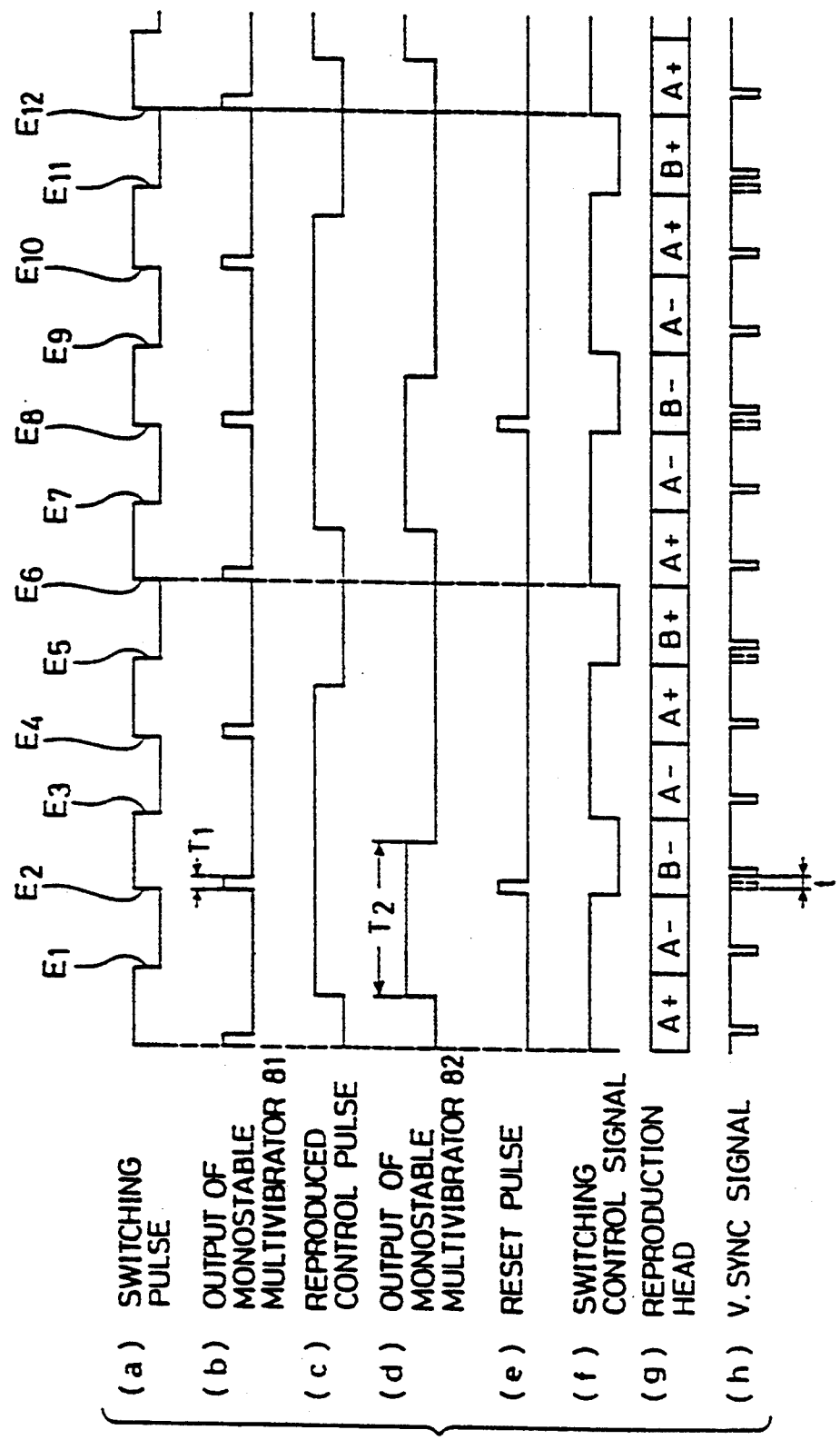
FIG. 21 is a timing chart for describing the operation of the fifth embodiment shown in FIG. 20.

The outputs of movable armatures 60e and 60f of first switching circuit 60 are applied to fixed contacts 70a and 70b of the succeeding second switching circuit 70. Movable armature 70c of switching circuit 70 responds to a switching control signal CS from a control circuit 91 where the level changes regularly (in a manner identical to that of the above-described fourth embodiment) according to a count value of counter 90 as shown in FIG. 21(f) to select either of fixed contacts 70a or 70b. More specifically, movable armature 70c is selectively connected to fixed contact 70b and fixed contact 70a when control signal CS attains a H level and a L level, respectively. The output from movable armature 70c of switching circuit 70 is applied to a video signal processing circuit 171 of the succeeding stage.

Video signal processing circuit 171 of FIG. 20 has a structure similar to that of video signal processing circuit 71 of the previous embodiments except for the addition of a time base correcting circuit 210 which will be described afterwards. More specifically, referring to FIG. 22, video signal processing circuit 171 includes a preamplifier 201, a luminance signal processing circuit 204, a chrominance signal processing circuit 205, an adder 206, and a Y/C separation circuit 207. A reproduced signal provided from second switching circuit 70 of FIG. 20 is amplified by a predetermined gain by preamplifier 201, and then provided to Y/C separation circuit 207 to be separated into a luminance and a chrominance signal. Because a luminance signal is FM demodulated at the time of recording, it is FM modulated by luminance signal processing circuit 204. The chrominance signal has its frequency converted to a low frequency range at the time of recording, so it is frequency-converted to a high frequency range by chrominance signal processing circuit 205. The outputs of signal processing circuits 204 and 205 are added by adder 206 to be provided as a reproduced video signal.

Figure 22:
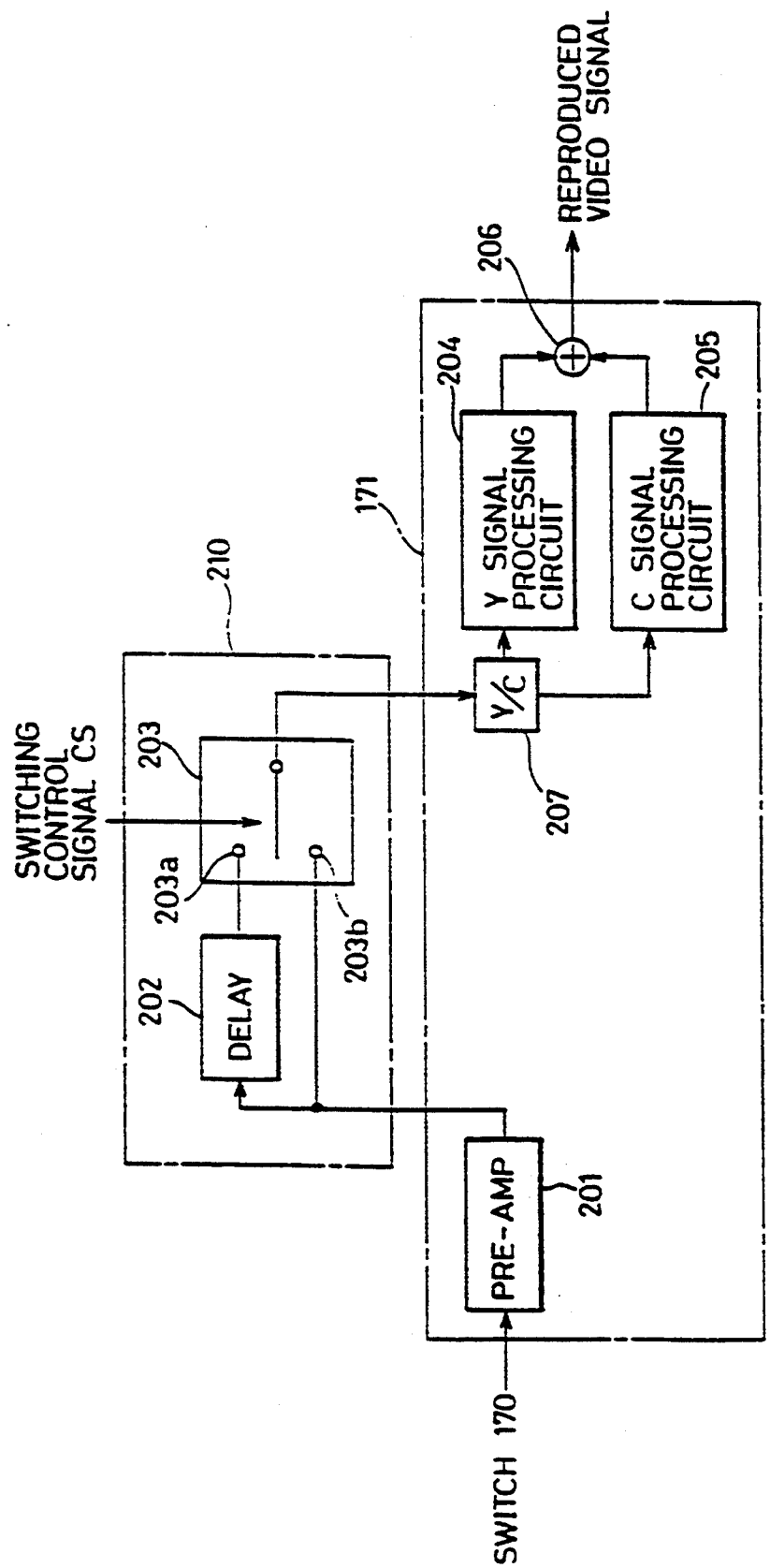
FIG. 22 is a block diagram showing in details the video signal processing circuit and the time base correcting circuit of FIG. 20.

Time base correcting circuit 210 including a delay circuit 202 and a third switching circuit 203 is additionally provided in video signal processing circuit 171. With regard to the implementation of delay circuit 202 and third switching circuit 203 in video signal processing circuit 171 as shown in FIG. 22, the output of preamplifier 201 is supplied to delay circuit 202 having a delay time of t and also to one fixed contact 203b of switching circuit 203. The delayed output from delay circuit 202 is applied to the other fixed contact 203a of third switching circuit 203. Either the output of delay circuit 202 or the output of preamplifier 201 can be selected by third switching circuit 203.

Here, delay time t is the time Satisfying the condition of $t=d/v$ where d is the head distance between heads A− and B+ or heads A+ and B−, and v is the running speed of the magnetic tape at the time of reproduction. Time t is set to a time period required for a preceding head of two adjacent heads to trace a certain position of the magnetic tape, followed by the succeeding head tracing the same position. This corresponds to the time difference generated by the preceding and succeeding heads tracing the same position on a tape. It is generally set to approximately 2H (H is a horizontal period).

The signal selection by third switching circuit 203 is carried out by a switching control signal CS from control circuit 91 used for signal selection by second switching circuit 70. When the switching control signal CS attains a L level, i.e. when the preceding head of B+ or B− is selected, a reproduced vertical synchronizing signal will be shifted forward by time t in comparison with a vertical synchronizing signal reproduced by succeeding head A+ or A−. Therefore, fixed contact 203a is selected to delay the shifted signal. When switching control signal CS attains a H level, i.e. when the succeeding head of A+ or A− is selected, fixed contact 203b is selected since the above-described delay is not required. The output of third switching circuit 203 is Y/C-separated, and then supplied to luminance signal processing circuit 204 and chrominance signal processing circuit 205 to be subjected to the above-described processes. The processed signals are added to each other and provided as a reproduced video signal.

By delaying or not-delaying the reproduced signal according to a switching control signal CS, the period of a vertical synchronizing signal in the reproduced signal provided from a third switching circuit 203 is always maintained constant regardless of which reproduction head is selected. Therefore, the period of a vertical synchronizing signal of the reproduced video signal from video signal processing circuit 171 is also maintained constant. When such a reproduced video signal is displayed on a screen of a monitor device, irregularity in the reproduced image can be prevented. In FIG. 21(h), the solid line indicates the position of a vertical synchronizing signal in the reproduced video signal after time base correction, and the broken line indicates the position of a vertical synchronizing signal before time base correction. It is apparent from FIG. 21(h) that the vertical synchronizing signal is shifted forward by a time of t only when the reproduced signal from the preceding head of B− or B+ is selected. This signal is delayed by delay circuit 202, whereby deviation in the period of a vertical synchronizing signal is absorbed.

Figure 23:
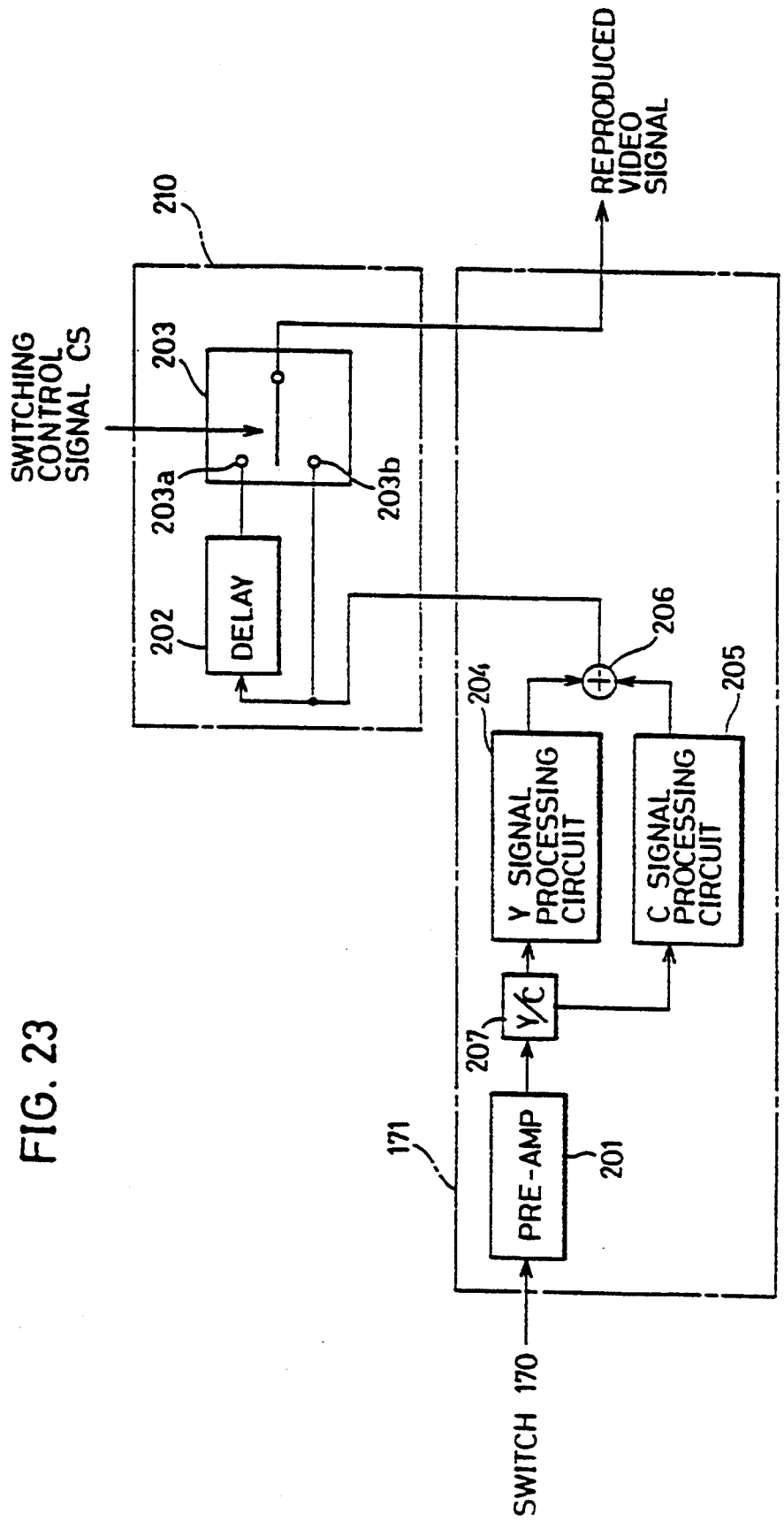
FIGS. 23–25 are block diagrams schematically showing other embodiments of the video signal processing circuit and time base correcting circuit of FIG. 20.

Time base correcting circuit 210 may be disposed in video signal processing circuit 171 as a succeeding stage of adder 206, as shown in FIG. 23, so that signal switching of delay or non-delay is carried out after the required signal processing of a luminance signal and a chrominance signal is applied.

Figure 24:
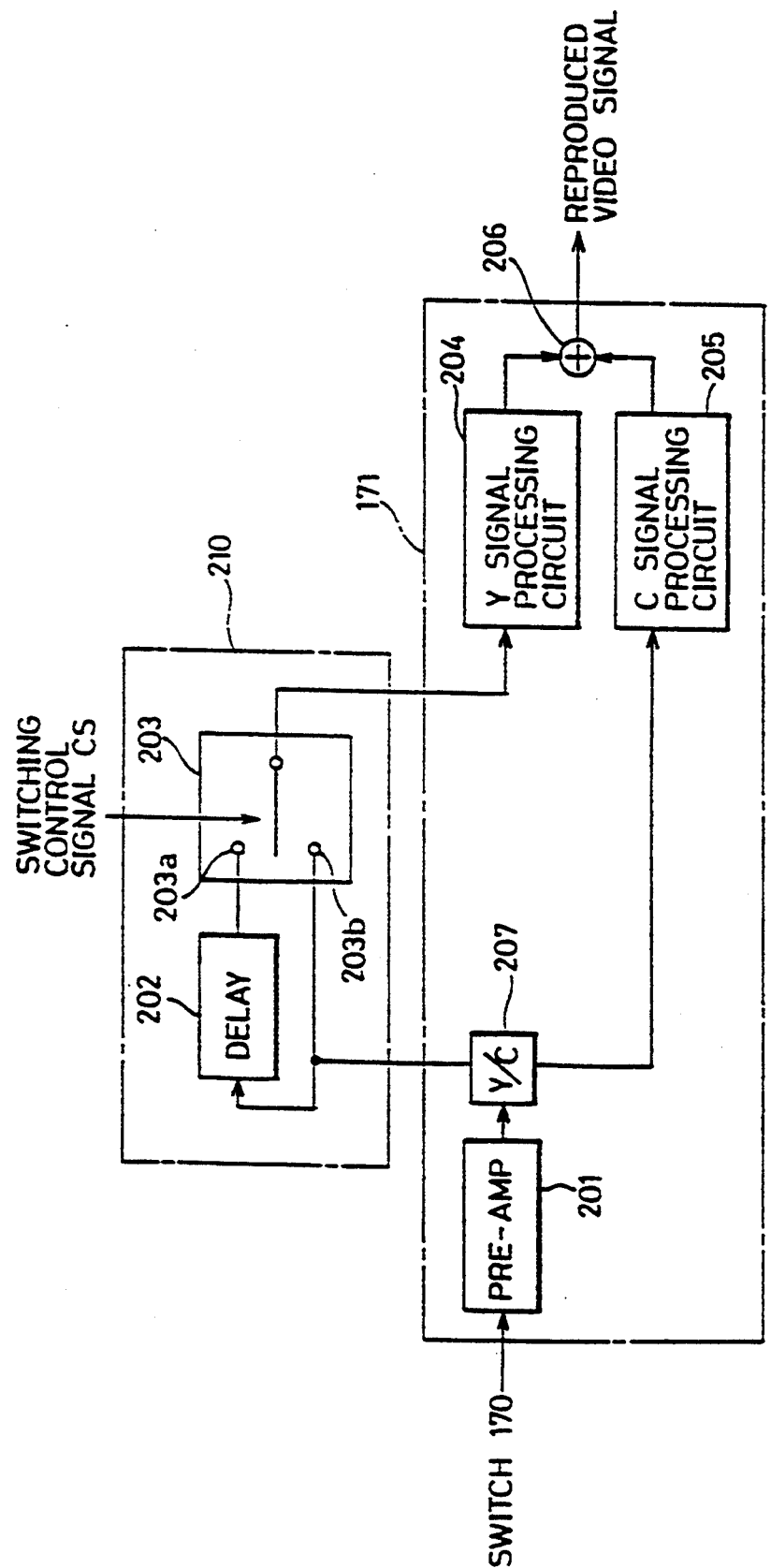
Figure 25:
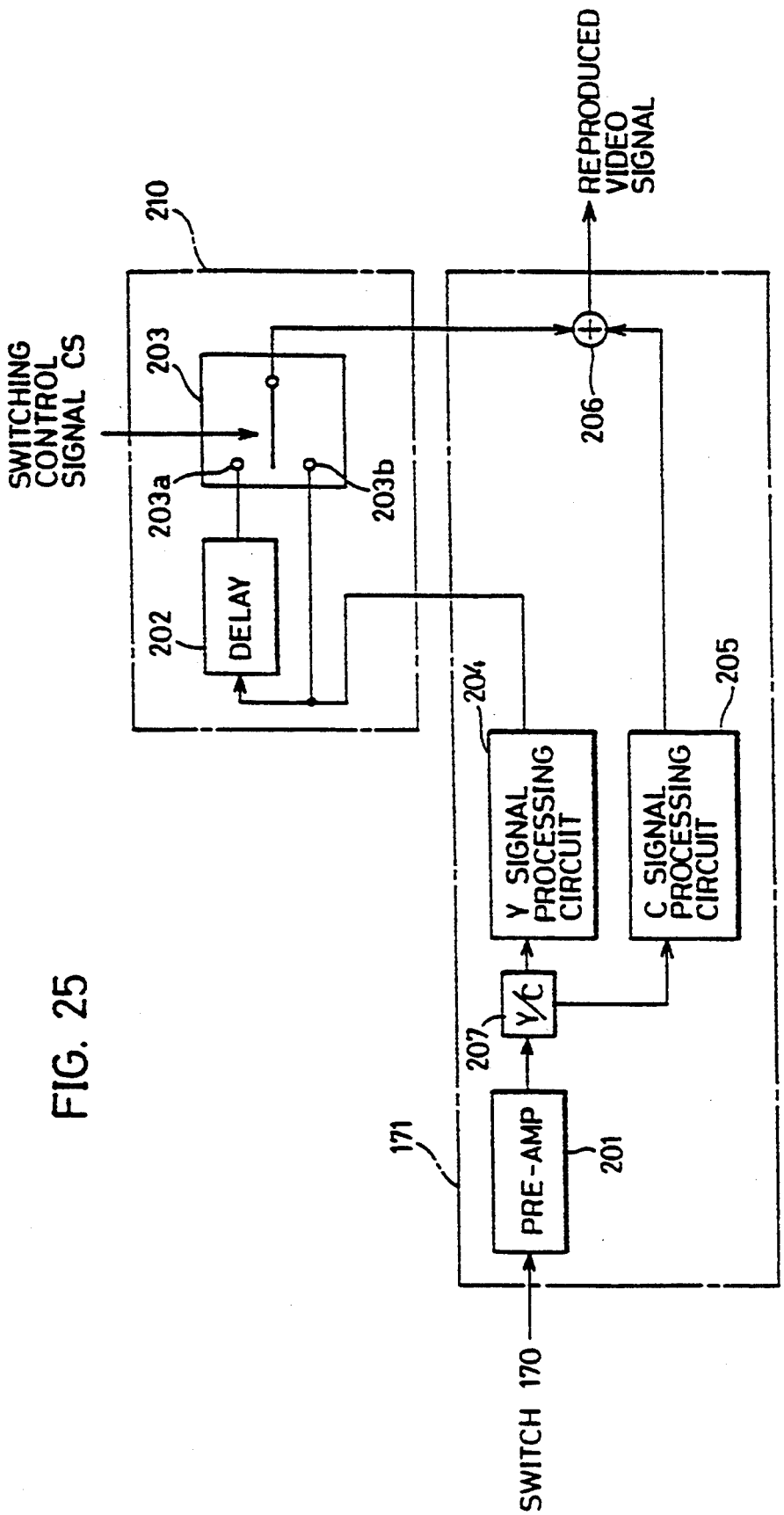

In order to maintain a constant period of a vertical synchronizing signal in the reproduced video signal, signal switching of delay or non-delay is to be carried out only for a luminance signal associated with the vertical synchronizing signal. Therefore, a similar effect can be obtained by applying time base correcting circuit 210 as a preceding stage of luminance signal processing circuit 204 as shown in FIG. 24, or as a succeeding stage of luminance signal processing circuit 204 as shown in FIG. 25. In this case, difference of the above-described delay time period is generated between the delayed luminance signal and the not-delayed chrominance signal. However, such a difference of about 2H has no influence on the reproduced screen of the monitor.

Thus, according to the fifth embodiment of the present invention, periodic change of a vertical synchronizing signal is suppressed concerning head distance between adjacent heads, and irregularity in the reproduced screen is prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video tape recorder for carrying out field extraction recording, comprising:
    a signal source for supplying a video signal to be recorded;
    gate means for intermittently extracting said supplied video signal at a ratio of one field to every three fields;
    means for designating a tape running speed of 1/9 the tape running speed of a standard mode in the video home system;
    means for driving and controlling a capstan motor to run a magnetic tape at said designated tape running speed; and
    a plurality of video heads for recording the video signal intermittently extracted by said gate means on a magnetic tape running at said designated tape running speed at an azimuth angle which differs from each field.

2. The video tape recorder according to claim 1, further comprising means for recording a control signal on said magnetic tape at a ratio of once for every six fields in synchronization with the recording timing of a video signal by a determined one of said plurality of video heads.

3. The video tape recorder according to claim 2, wherein said gate means comprises
    means for separating a vertical synchronizing signal from said supplied video signal,
    means for generating a gate control signal that defines the timing of extracting a video signal at a ratio of one field to every three fields in response to said separated vertical synchronizing signal, and
    a gate circuit responsive to said gate control signal for extracting intermittently said video signal.

4. The video tape recorder according to claim 2 wherein said plurality of video heads comprise a pair of video heads having azimuth angles which differ from each other, and arranged opposite each other by 180° along the circumference of a rotary cylinder, and to which a video signal extracted by said gate means is commonly applied.

5. The video tape recorder according to claim 2, wherein said means for designating a tape running speed comprises:
    a memory in which data is stored indicating the rotation period of said capstan motor in a standard mode of the video home system, and
    arithmetic means for multiplying by 9 the period data stored in said memory.

6. The video tape recorder according to claim 5, wherein said drive control means of said capstan motor comprises
    means for detecting the rotation period of said capstan motor,
    means for comparing said detected rotation period and the rotation period multiplied by 9 by said arithmetic means to provide the difference thereof as a speed error signal, and
    means for driving and controlling said capstan motor so that said speed error signal becomes 0.

7. A video tape recorder for carrying out field extraction recording, comprising:
    a signal source for supplying a video signal to be recorded;
    gate means for extracting intermittently said supplied video signal at a ratio of one field to every three fields;
    means for designating a tape running speed of 1/12 the tape running speed of a standard mode in the video home system;
    means for driving and controlling a capstan motor to run a magnetic tape at said designated tape running speed; and
    a plurality of video heads for recording the video signal intermittently extracted by said gate means on a magnetic tape running at said designated tape running speed at an azimuth angle which differs from each field.

8. The video tape recorder according to claim 7, further comprising means for recording a control signal on said magnetic tape at a ratio of once for every six fields in synchronization with the recording timing of a video signal by a predetermined one of said plurality of video heads.

9. The video tape recorder according to claim 8, wherein said gate means comprises
    means for separating a vertical synchronizing signal from said supplied video signal,
    means for generating a gate control signal that defines the timing of extracting a video signal at a ratio of one field to every three fields in response to said separated vertical synchronizing signal, and
    gate means responsive to said gate control signal for extracting intermittently said video signal.

10. The video tape recorder according to claim 8, wherein said plurality of video heads comprise a pair of video heads having azimuth angles differing from other, and arranged opposing to each other by 180° along the circumference of a rotary cylinder, and to which a video signal extracted by said gate means is applied in common.

11. The video tape recorder according to claim 8, wherein said means for designating a tape running speed comprises
    a memory in which data is stored indicating the rotation period of said capstan motor in a standard mode of the video home system, and
    arithmetic means for multiplying by 12 the period data stored in said memory.

12. The video tape recorder according to claim 11, wherein said drive control means of said capstan motor comprises
    means for detecting the rotation period of said capstan motor, means for comparing said detected rotation period and the rotation period multiplied by 12 by said arithmetic means to provide the difference thereof as a speed error signal, and means for driving and controlling said capstan motor so that said speed error signal is 0.

13. A video tape recorder for carrying out field extraction recording, comprising:

a signal source for supplying a video signal to be recorded;

gate means for extracting intermittently said supplied video signal at a ratio of one field to every three fields;

means for selectively designating a tape running speed of one of 1/9 or 1/12 the tape running speed of a standard mode in the video home system;

means for driving and controlling a capstan motor to run a magnetic tape at said designated tape running speed; and a plurality of video heads for recording the video signal intermittently extracted by said gate means on a magnetic tape running at said designated tape running speed at an azimuth angle which differs from each field.

14. The video tape recorder according to claim 13, further comprising means for recording a control signal on said magnetic tape at a ratio of once for every six fields in synchronization with the recording timing of a video signal by a determined one of said plurality of video heads.

15. The video tape recorder according to claim 14, wherein said gate means comprises means for separating a vertical synchronizing signal from said supplied video signal, means for generating a gate control signal that defines the timing of extracting a video signal at a ratio of one field to every three fields in response to said separated vertical synchronizing signal, and a gate circuit responsive to said gate control signal for extracting intermittently said video signal.

16. The video tape recorder according to claim 14, wherein said plurality of video heads comprise a pair of video heads having azimuth angles differing from each other, and arranged opposing to each other by 180° along the circumference of a rotary cylinder, and to which a video signal extracted by said gate means is applied in common.

17. The video tape recorder according to claim 14, wherein said means for designating a tape running speed comprises a memory in which data is stored indicating the rotation period of said capstan motor in a standard mode of the video home system, first arithmetic means for multiplying by 9 the period data stored in said memory, second arithmetic means for multiplying by 12 the period data stored in said memory, and means for selecting one of said first and second arithmetic means.

18. The video tape recorder according to claim 17, wherein said drive control means of said capstan motor comprises means for detecting the rotation period of said capstan motor, means for comparing said detected rotation period and the rotation period multiplied by 9 or 12 by a selected said first or second arithmetic means to provide the difference thereof as a speed error signal, and means for driving and controlling said capstan motor so that said speed error signal becomes 0.

* * * * *